United States Patent
Rosenberger et al.

(10) Patent No.: US 7,067,057 B2
(45) Date of Patent: Jun. 27, 2006

(54) FLUID CONVEYED MATERIAL COLLECTION SYSTEM

(75) Inventors: Stefan Rosenberger, Moembris (DE); James H Wilson, Columbia, SC (US); Thomas S Snyder, Oak Ridge, TN (US)

(73) Assignee: RWE Nukem Corporation, Columbia, SC (US)

( * ) Notice: Subject to any disclaimer, the term of this patent is extended or adjusted under 35 U.S.C. 154(b) by 39 days.

(21) Appl. No.: 10/154,693

(22) Filed: May 24, 2002

(65) Prior Publication Data

US 2002/0179545 A1  Dec. 5, 2002

Related U.S. Application Data

(63) Continuation-in-part of application No. 10/111,721, filed as application No. PCT/US00/41663 on Oct. 27, 2000, now Pat. No. 6,709,599.

(60) Provisional application No. 60/161,853, filed on Oct. 27, 1999.

(51) Int. Cl.
*B01D 61/20* (2006.01)
*B01D 65/08* (2006.01)

(52) U.S. Cl. .................. 210/195.2; 210/206; 210/252; 210/323.1; 73/863.23; 73/863.24; 436/178

(58) Field of Classification Search ............. 73/863.23, 73/61.59; 436/177, 178; 210/650, 652, 210/806, 252, 323.1, 195.2, 206, 863.24; 422/101

See application file for complete search history.

(56) References Cited

U.S. PATENT DOCUMENTS

| | | | | |
|---|---|---|---|---|
| 4,000,065 A | * | 12/1976 | Ladha et al. | 210/652 |
| 4,276,177 A | | 6/1981 | Smith | |
| 4,820,426 A | | 4/1989 | Pfertzel et al. | |
| 4,978,506 A | | 12/1990 | Calderwood | |
| 4,983,302 A | | 1/1991 | Bálint et al. | |
| 4,983,305 A | * | 1/1991 | Oklejas et al. | 210/642 |
| 5,266,202 A | * | 11/1993 | Okonogi et al. | 210/637 |
| 5,501,798 A | * | 3/1996 | Al-Samadi et al. | 210/652 |
| 5,585,531 A | | 12/1996 | Berker et al. | |

FOREIGN PATENT DOCUMENTS

JP  01104309 A  *  4/1989

* cited by examiner

*Primary Examiner*—Terry K. Cecil
(74) *Attorney, Agent, or Firm*—Sara Centioni; Nexsen Pruet, LLC

(57) ABSTRACT

The present invention is for processing fluids, especially waste streams from nuclear power plants, and other fluid media that may be carrying valuable or useful substances, in order to collect the substances. The system uses sequential filtering and multiple passes to concentrate the substances, which allows the system to collect virtually all of the substances of interest to the user while reducing the volume of both the unwanted materials as well as the desired materials desired without affecting the purity of the fluid after processing. Additionally, the collected substances can be processed in-place, and without requiring any thermal processing prior to disposal of unwanted substances, or for the recovery and/or reuse of valuable substances.

17 Claims, 5 Drawing Sheets

FLUID CONVEYED MATERIAL COLLECTION SYSTEM

CROSS REFERENCE TO RELATED APPLICATIONS

This application is a continuation-in-part of Applicant's pending U.S. patent application Ser. No. 10/111,721, now U.S. Pat. No. 6,709,599, which was filed on Apr. 26, 2002, and which is a national stage filing of PCT application Ser. No. PCT/US00/41663, filed Oct. 27, 2000, which claimed the benefit of the filing of U.S. provisional patent application Ser. No. 60/161,853, filed on Oct. 27, 1999. Applicants claim the priority date benefits of these applications.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates generally to the processing of fluid media by filtration. In particular, the present invention relates to the processing of a wide range of fluid media in order to separate and/or collect substances carried by such media.

The fluids used in nuclear power plants and at other manufacturing and processing facilities can be contaminated with substances that should not be directly released into the environment, or, on the other hand, may carry valuable or useful substances such as metals, ceramics, pharmaceuticals, or biotechnical materials or compounds. In either case, the fluid media from such facilities must be processed to remove unwanted or undesired constituents of the fluid prior to discharge or reuse, and/or processed to collect the desired valuable or useful substances. The fluid media can come from a variety of sources including, but not limited to, industrial, power generation utilities and other similar sources of fluids and exhaust gases; spent fuel pools; floor drains from nuclear power and industrial facilities; resin tank drains; evaporator bottoms; and the source of fluids can come from other fluid processes including, but not limited to, those used in metal finishing and/or recovery operations; pharmaceutical synthesization or fabrication; ceramic production; hydrometallurgical and mining applications; coal cleaning; hydrothermal processing; mineral beneficiation; and biotechnical material or compound collection. Because of environmental concerns, increasing disposal costs and other economic considerations, the separation of the contaminants and/or the valuable or useful substances from the fluids that carry them has become more and more important. The goals of this separation can include: (1) the removal and concentration of a sufficient amount of contamination from the fluid so that the resulting effluent can be reused or released to the environment after further processing, or, in some cases, directly released or reused; (2) the removal and concentration of a significant percentage of the valuable or useful substances carried by the fluid; (3) the reduction of the volume of waste that must be disposed of, and/or (4) the availability of a highly concentrated form of valuable materials suitable for economical recovery or recycling.

A number of techniques are used to attempt to separate substances from fluids, including filtration, ion exchange, evaporation, crystallization and adsorption. Generally, filtration is a process in which a separating medium or device (i.e., a filter) capable of removing small particles from a gas or liquid by mechanical (or diffusion based) interception is used to separate such small particles (i.e., the "reject" and/or "concentrate") from the fluid that passes through the separating medium or device (i.e., the "filtrate" and/or "permeate"). Also, the separation of the substances from the fluid by filtration is generally based on the difference between the size of the particles of the substance and the openings in the filter medium, but sometimes filtration is also aided by electrostatic forces, hydrophobic/hydrophilic interactions and other interfacial phenomena that enhance or preclude selective species transport across the membrane, and/or by chemical reactions. Moreover, with respect to filtration and ion exchange, the collected substances can be particulate and/or dissolved ions of varying sizes, which commonly requires these two techniques to be used in a particular sequence.

Sometimes more than one type of filter is used. For example, in a standard single-pass filtration process, roughing filters are first used to remove larger particles, and then ever finer, polishing filters (i.e., those filters that are potentially capable of removing smaller and smaller sized particulate including, but not limited to, screen filters, microfilters, ultra filters, nano-filters, and hyper filters, i.e., reverse osmosis membranes) are used to remove smaller particles. By using the various types and sizes of filters in this manner, this filtration process may be able to remove a high percentage of the particulate while attempting to protect the finer membranes from the damage that could be caused by larger particles. Therefore, it is standard practice to use various sized (and/or types of) filters in a specific sequence; with the coarser filters (i.e., filters having larger particle collection size ratings) being used first in an attempt to remove the larger particulate, then ever finer filters in an attempt to remove the smaller particulate.

The philosophy of this approach makes good sense for several reasons, especially when considered from the perspective of having a fluid medium that is carrying a moderate level of particulate. In such an environment, if a fine filter is used first, the amount of particulate it would remove would be so great that the filter would quickly become fouled with both fine and coarse particulate, which would cause the flow through the filter to stop altogether, and which could occur soon after being placed in service. Therefore, by using filters in sequence, from coarse (roughing) to fine (polishing), attempts to assure that the throughput of each filter is as high as possible. Furthermore, because filters with smaller pore size are generally more expensive, it makes better economic sense to use the finer filters for filtering only the smallest particles and not also for filtering out particles that could be removed from the fluid with less expensive filters. Additionally, some fluid media require further substance removal after filtration in order to attempt to remove dissolved substances from the fluid. This is generally accomplished by sending the filtrate from the last filter, or set of filters, to an ion exchanger and/or a reverse osmosis unit, which, in combination with the standard filtering method, may result in producing a treated fluid that can be nearly free of both particulate and dissolved species.

The processes just described can work well, and, in general, produce clean filtrates and/or permeates, potentially remove many of the substances carried by the fluid, and may allow for the safe disposal of the unwanted substances. However, they focus solely on obtaining a clean filtrate and not on obtaining an efficient volume of collected materials, which would be economically beneficial, if obtained, i.e., an efficient volume of collected materials would essentially consist of only those substances intended to be collected.

Furthermore, because of environmental concerns and the rising costs associated with the disposal of unwanted substances, e.g., radioactive, toxic, and/or hazardous waste, there is a growing need to make a concerted effort to reduce the volume of the wastes being disposed of, and, because it is also desirable to recover valuable and/or useful substances carried by some fluid media—especially in a highly concentrated form—there is also a need for a way to process such fluid media so that the valuable and/or useful substances can be efficiently and relatively inexpensively collected and/or recovered. Therefore, based on the foregoing, a need remains to remove substances from various fluid media in a way that results in an efficient collection of such substances, provides for easier handling of the substances collected, and does not compromise the quality of the filtrate and/or permeate produced.

BRIEF SUMMARY OF THE INVENTION

According to its major aspects and briefly recited, the present invention is a method of filtering and an apparatus or system for processing fluid media in order to collect substances carried by such media. The fluid media of interest include, but are not limited to waste streams from nuclear power plants, and the fluid media associated with: metal finishing and/or recovery operations; pharmaceutical synthesization or fabrication; ceramic production; hydrometallurgical and mining applications; coal cleaning; hydrothermal processing; mineral beneficiation; and biotechnical material or compound collection. Because the present system is able to use multiple passes to highly concentrate the substances of interest, it can virtually collect all of the substances of interest to the user in a minimal volume, and compared to the prior art processes, the present system also reduces the collection of any unwanted materials, yet without affecting the purity of the filtrate and/or the permeate. This, of course, simplifies the handling of the collected substances, and with respect to collecting radioactive contaminants from a fluid, as an example, but not as a limitation, the present system is able to significantly reduce the handling and the disposal volume of the collected substances, and, therefore, is able to reduce the associated disposal costs.

In order to achieve the collection of virtually all, if not all, suspended solids, including, but not limited to, colloids, combined with a reduction in volume, a portion of the reject (or concentrate) from an initial step substance collection device is sequentially or further processed through an additional processing step having a final step substance collection device, and the filtrate (or permeate) from this final step substance collection device, after such additional processing, is then returned upstream of the initial step substance collection device. In other words, the fluid is "recycled" by being repeatedly directed back to the initial step substance collection device and then through the final step substance collection device until, through the "recycle to extinction" analogy, virtually all of the substance of interest, i.e., the substance intended to be collected, is collected by the final step substance collection device (or, in other words, until most, if not all, of the particulate is collected by the final step substance collection device). Then, if required, virtually all, if not all, fluids are removed from the materials collected by the final step substance collection device through the use of fluid removal or displacement processes. Afterwards, the collected substances may be disposed of if they are unwanted, or recycled and reused if they are valuable and/or useful. Notably, in the present system, the initial step substance collection device has an equal or higher rejection rate (i.e., it can collect smaller particles or, in other words, it has a smaller particle collection size rating) than the final step substance collection device for the material to be collected. In other words, the fluid is sequentially processed by first being directed to a filter having a smaller collection size rating then the next filter in the filtering sequence.

More specifically, the additional processing step includes, but is not limited to: (1) establishing a high velocity flow across the upstream surface of each filtering element contained within the initial step substance collection device so that the reject or concentrate (i.e., the substances collected by the initial step substance collection device) can be carried away from the initial step substance collection device by a reject recirculation stream carried within a recycle loop. This prevents the initial step substance collection device from becoming fouled, which would reduce its capacity, and which is troublesome for some prior art systems; and (2) diverting a portion of the fluid and reject from the initial step substance collection device through the final step substance collection device at a low flux. The purpose for maintaining the velocity, the flux, or the energy input of the fluid passing through the final step substance collection device very low is to maximize the substance loading of the final step substance collection device's filtering elements, and also to increase its particle removal efficiency.

Since the final step substance collection device will collect substances including, but not limited to, those that are valuable, useful, or desirable, or, if otherwise used, to collect substances that are hazardous or toxic, the substances collected by the final step substance collection device will normally cause the pressure drop across the final step substance collection device to increase, and, when the maximum allowable differential pressure drop across the device is reached, or the final step substance collection device is filled with substance, and/or other limiting criteria are reached, the final step substance collection device and/or its filter elements will be replaced with a new or recycled final step substance collection device and/or filter elements. Related to this, when collecting radioactive contaminants, the final step substance collection device will be replaced when the maximum allowable radiation dose rate, activity level, safe mass levels, and/or other limiting criteria are reached.

The final step substance collection device collects virtually all, if not all, of the particulate, including those particles smaller than its "particle collection size rating" (which is herein defined as the minimum particle size that can be collected by the device including, but not limited to, the sizes normally associated with suspended particles, dissolved species and/or macromolecules) because, for all practical purposes, it has a non-zero particle collection efficiency over the range of particle sizes carried by the fluid and, as long as the particle collection efficiency is greater than zero, the final step substance collection device will eventually, after repeated recycling passes, collect virtually all, if not all, particles including, but not limited to, suspended solids, dissolved species and/or macromolecules. Moreover, by recycling the final step substance collection device filtrate back to the initial step substance collection device, the concentration of the particles in the recycle loop may build up to a level where the rate of particle removal in one pass through the final step substance collection device may equal the rate of particles being introduced with the fluid being fed to the initial step substance collection device, thereby establishing an equilibrium or steady-state condition.

One contributing factor as to why the final step substance collection device will collect particles smaller than its particle collection size rating is due to the process of particle agglomeration occurring in a cake-like matrix that is primarily formed by the substances being collected (but which may also be formed by the introduction of "pre-coating" or "seeding" materials that may be used as a catalyst or stimulus for filter cake formation). Agglomeration is a tendency of the particles to form clusters that interlock. The interlocking clusters define narrow, twisting passages through a cake-like matrix that will allow fluid to flow through the matrix, but, because these passages are irregular; that is, they change direction and vary in cross section, this results in a substance collection action that will trap particulate smaller than the particle collection size rating of the final step substance collection device. Additionally, particle agglomeration can be enhanced through the use of coagulants, polyelectrolytes, and other similar agents. The use of these agents is not preferred, however, and, if used, they must be used carefully since they can foul the filter elements of the substance collection devices. If necessary, or desired, the final step substance collection device, and/or any of the other substance collection devices, may be "pre-seeded," or "pre-coated" with various materials well known in the field including, but not limited to, diatomaceous earth, powdered resins, activated carbon, or other granular materials, to initiate the collection of the substances including, but not limited to, colloidal substances. The use of this pre-coating can be particularly helpful if the substances contained in the fluid have a particle size that is close or smaller than the particle collection size rating of the substance collection device. Therefore, agglomeration is just one of the reasons that smaller, as well as rated, particles can be collected by the final step substance collection device. In fact, as long as any other particle collection mechanism including, but not limited to, adsorption, produces a particle collection efficiency that is greater than zero, agglomeration is not necessary for the final step substance collection device to work at all in trapping particles that are smaller than the particle collection size rating of the collection device.

While other forces, such as adsorption, also contribute to the collection of the particles, it is the formation of the cake-like matrix, or cake, of particulate against the upstream side of the final step substance collection device's filter elements that provides a significant and unexpected contribution to the collection of small particles. The cake in effect becomes part of the final step substance collection device, and cake formation effectively reduces the particle collection size rating and increases the effective substance collection depth of the final step substance collection device, which increases the likelihood that a small particle that enters the filter will become trapped, adsorbed, or otherwise collected by the final step substance collection device. To help assure cake formation, a low flux (or low fluid velocity and/or energy input) is used through the final step substance collection device to prevent undue forces from acting on the particulate cake, which could disrupt the adsorption forces or break up the particulate cake itself.

Additionally, if needed, the system's substance collection efficiency can be improved by a variety of means including, but not limited to: precipitation; or the previously mentioned seeding or introduction of other filter pre-coating materials that can be used to collect the substances of interest including, but not limited to, the introduction of materials that act as a catalyst or stimulus in forming a filter cake or collection matrix; and/or by adding substance "eating" bacteria that can transform substances into forms that allow for subsequent collection. For example, but not as a limitation, dissolved metal ions, or other dissolved species, can be precipitated out of solution for collection by the present invention system. This can be accomplished by adding sulfides or other chemicals (e.g., other precipitating agents or pH adjusting chemicals) upstream of any of the substance collection devices including, but not limited to, the initial step or the final step substance collection devices. Preferably, the addition of the agents to the system will take place in a system feed tank, or a fluid holding tank, which is located upstream of the initial step substance collection device, and which may include temperature adjusting means as well as agitation means to promote precipitation. By using precipitation, the dissolved ions can become suspended in the fluid and, therefore, be made available for collection instead of having them pass through the initial step substance collection device, as part of the initial step substance collection device's filtrate (and/or permeate), which can occur when the particle collection size rating of the initial step substance collection device does not permit for removal of the dissolved species of interest (but may be precluded by selecting a particle collection size rating that will cause the dissolved ions to be filtered from the fluid). In other words, the dissolved ions can be precipitated out of the fluid and the suspended solids that result can be collected from the fluid (along with or apart from the other particulate) by the final step substance collection device. Moreover, the precipitation of metals, and other dissolved species, can be so effective that further treatment downstream of the initial step substance collection device may become unnecessary, thus saving the costs associated with having to maintain and operate separate processing equipment in order to remove dissolved species. In some applications, however, this further processing can be effectively and economically provided by another embodiment of the present invention system, which will be described below, that is generally based on splitting the fluid processing into a suspended solids removal stage in combination with a dissolved ion removal stage.

The present invention has a number of advantages over other systems. In particular, it is a filtration system that can collect substances from a fluid medium while it also produces a filtrate stream that is sufficiently clean for release or re-use, and it uses a final step collection device that is easy to handle and, when necessary, suitable for disposal or recycling. The present invention system is the first cross-flow filtration system that allows for the collection of virtually 100% of all substances of interest contained in a fluid while also allowing virtually 100% of the fluid to be removed from the present system for reuse or release to the environment. Moreover, other cross-flow systems require that concentrate fluids are permanently and/or continuously "bled-off" from their systems. This is done to avoid fouling the membrane surfaces used in these other systems or to direct these fluids for further external treatment. The present invention system, however, eliminates the need to remove these concentrate fluids from the present system itself. Furthermore, these other systems also require that their collected materials are processed externally, away from the collection system, while the design of the present invention system allows for the in-place processing of its collected substances.

Another advantage of the present system is that it avoids the generation of an inefficient volume of collected substances by using various volume control means to limit the amount of unwanted substances such as excess fluid. Furthermore, the present system does this without requiring such additional post-collection processing such as drying, solidifying, settling, and possibly centrifuging of the substances collected, which allows the present system to avoid the costs associated with these processes, along with the corresponding effort. Moreover, the present system eliminates the need for, or the use of, thermal treatment processes to remove fluids from the collected substances, which can be highly detrimental to the collection of many substances including, but not limited to, bio-compounds. Also, with respect to these additional processes, the present system avoids or limits the possible undesirable exposure associated with the collection of harmful substances.

The present invention system may allow for the effective separation of the fluid into two primary collection streams, one that primarily contains suspended solids and the other that primarily contains dissolved solids. This separation opens the door for independent and specific processing of each such collection stream, which can be accomplished by the present invention system. The present invention system, however, is very flexible and, depending on the application, can be set-up in a variety of configurations including, but not limited to: a single-stage two-step embodiment (having a initial step and a final step substance collection device); a multi-stage embodiment having a single two-step stage and a single three-step stage (which has a initial step, an intermediate, and a final step substance collection device in the three-step stage); a single-stage three-step embodiment; or any other configuration suitable for the application for which it is being used, including more than two stages and more than three steps, for example, but not as a limitation, a more than three-step embodiment can have two or more intermediate steps each using the same or a different substance collection agent and each being used with the same or a separate final step device in order to simultaneously collect a variety of substances individually.

A feature of the present invention system, which may rely on either mechanical or on "solution-diffusion" based devices for the collection of substances, is that it successfully removes virtually all, if not all, particulate, notwithstanding the fact that the final step substance collection device has a removal efficiency of less than 100% per pass. This success is achieved by repeated recycling of the fluid in combination with the low flux across the final step substance collection device. In the present invention, the use of a low flux substance collection flow path off of the recycle loop maximizes the system's per pass removal efficiency and the loading of solids, i.e., collected substances, in the final step substance collection device and, consequently, minimizes additional reject (or concentrate) treatment. The use of a low flux also extends the life and minimizes the replacement frequency of the filter elements used to collect the substances of interest (or of the substance collection device itself), and provides numerous other benefits including, but not limited to: the elimination of the need to use thermal fluid removal processes, such as drying; and the generation of a easier-to-handle superconcentrate (i.e., the superconcentrate contains more solids than liquids making it easier to use and handle, which, for example, can cause a reduction in radiation exposure to those personnel involved in the processing of radioactive media, and can lower overall equipment and material costs).

Another feature of the present invention is that it also takes advantage of chemical treatment including, but not limited to pH adjustment, and/or the addition of precipitating and/or collection agents to the fluid media, preferably, upstream of the initial step substance collection device, which also may include, but is not limited to, the possible use of bacteria, and/or the use of sulfides, sulfites or any other suitable chemicals, to facilitate the collection of dissolved metal ions, and/or other dissolved species. This feature enables the metal ions, or the other dissolved species, to be removed along with the suspended substances originally extant in the fluid medium, which may make it possible to directly discharge or reuse the filtrate (or permeate) from the initial step substance collection device without the need for further processing steps, such as standard reverse osmosis or ion exchange.

Another advantage of the present invention system is that it can be easily configured and expanded to meet an individual facility's fluid characteristics and/or configurations; therefore, it can be readily installed into the fluid systems of existing facilities, or it can be operated on a stand-alone basis. Moreover, the present invention system has a very small footprint, which, besides adding to a fast set-up time, enables the system to be both highly mobile and able to be operated in very small areas. To add to the fast set-up time and ease of use, the system can be configured to include "quick-connect/disconnect" features. All of which, besides the system's economy and efficiency, makes the system highly desirable for a wide variety of application including, but not limited to, the on-site processing of fluid media for remediation purposes or during the decommissioning of nuclear power plants. To further add to the ease of use, the present invention system includes a multi-purpose container (and/or a modified multi-purpose container) to house and/or process the final step substance collection device and/or its collected substances. The multi-purpose container (and/or its modified version) is a combination processing enclosure, transport container, and disposal container that allows for the direct processing of the collected substances (including, but not limited to, fluid removal and/or solidification processes) while the final step substance collection device is still attached to the remaining components of the present invention system. This is especially convenient and provides for both material and labor cost savings by eliminating intermediate handling and processing steps extant in other prior art systems.

Besides having reject recirculation streams and/or recycle loops, the usable surface area of some of the filter elements is maximized and the chemical cleaning requirements of these elements are minimized by the additional feature of backflushing. Generally, backflushing is used with the filtering elements of the initial step and/or intermediate step substance collection devices to remove materials deposited on their upstream surfaces. However, backflushing also may be one of the methods used to recover the valuable, desirable, and/or useful materials collected by the final step substance collection device(s), and after backflushing the final step substance collection device may be available for reuse in the present system. For example, carbon dioxide, other gases, and/or volatile fluids can be used to backflush the collected materials from the filter element(s) in order to recover and/or reuse such substances. Furthermore, the efficiency of backflushing, as used in the present system, can be improved by using a pump or by pressurizing the backflushing fluid to produce a high velocity reverse flow through the filter elements of the substance collection device being backflushed. Efficiency also can be improved by introducing air or ozone, or any other suitable gas, preferably under pressure, into the backflush fluid and/or into the reject recirculation stream carried by the recycle loop, and/or by using ultrasonic technology to dislodge substances from the filter elements. And, since the reject recirculation stream flows across the upstream surface(s) of the initial step substance collection device at a high velocity, it would improve backflushing effectiveness by increasing turbulent flow, which would cause the laminar flow layer across the surface of the filtration elements to decrease allowing more cleaning to occur, which, should increase the usable lifetime of the substance collection device being backflushed. Additionally, the effectiveness of backflushing and/or the cleaning of the initial step and/or intermediate substance collection device surfaces may be improved by introducing chemical and/or bacterial cleaning agents into the backflushing fluid, and/or chemical, and/or bacterial, and/or mechanical cleaning agents into the reject recirculation stream. This should allow a more effective cleaning of the particulate from the laminar flow areas of the backflushed collection devices to occur. In some applications, instead of directly processing the materials released during backflushing, the materials may be collected and stored in a backflush collection tank, and later released back into the system for processing or properly disposed of through other means.

The present invention is being described with frequent reference to radioactive contaminants generated at nuclear power plants. However, it is applicable to all fluid media having suspended particulate, dissolved materials, and/or any other appropriate species suitable for collection from such media. For example, but not as a limitation, the present invention can be used for the recovery of valuable and/or useful substances associated with metal finishing, metal recovery, and/or ceramic production.

Also included among its many uses, the present invention system provides the advantage of being an alternative to fluid bed processing and its associated risks, and it can be used to stabilize, e.g., solidify or vitrify, nuclear reactor and other hazardous wastes prior to disposal, preferably, as a part of post-collection processing.

Still another advantage of the present system is that it has "low-shock" characteristics including, but not limited to, the absence of thermal processing, which minimizes the introduction of changes to the molecular structure of proteins and nucleic acids, so that their original biological properties are not degraded. This makes the present invention especially useful for the collection and/or concentration of biotechnical materials or bio-compounds including, but not limited to, pyrogens, proteins, peptides, enzymes, viruses, antigens, and/or bacterial cells. The present invention's characteristics also make it suitable for the synthesization or manufacture of pharmaceutical compounds, and for many other suitable uses including, but not limited to, the collection of macromolecules.

Another important feature of the present invention is the use of sequential substance collection devices and flow paths, and the preferable use of a final step substance collection device having a particle collection size rating that is equal to or larger than the particle collection size rating of the initial step substance collection device. This feature is counter-intuitive because, in the prior art, fluid media are typically passed through a series of filters, for example, beginning with coarser filters having a large particle collection size rating and proceeding through finer filters having smaller and smaller particle collection size ratings. However, it should be noted that while this is the preferred particle collection size configuration, there may be uses of the present system in which it would be desirable to have a final step and/or an intermediate step substance collection device with a particle collection size rating that is smaller than the collection size rating of any of the preceding substance collection device in the sequence of collection devices.

Still another feature of the present invention is the use of a low flux through the final step substance collection device to trap particles, including those smaller in size than the particle collection size rating of the final step substance collection device. Since this combination eliminates the need for, or the use of, more expensive particle collection devices including those that have to be highly efficient at typical single-pass processing, the present invention system provides greater levels of substance collection at lower costs than would otherwise be achievable.

Other features and their advantages will be apparent to those skilled in the art of collecting substances from a fluid medium from a careful reading of the Detailed Description of the Invention accompanied by the following Drawings.

DETAILED DESCRIPTION OF THE INVENTION

Figure 1:
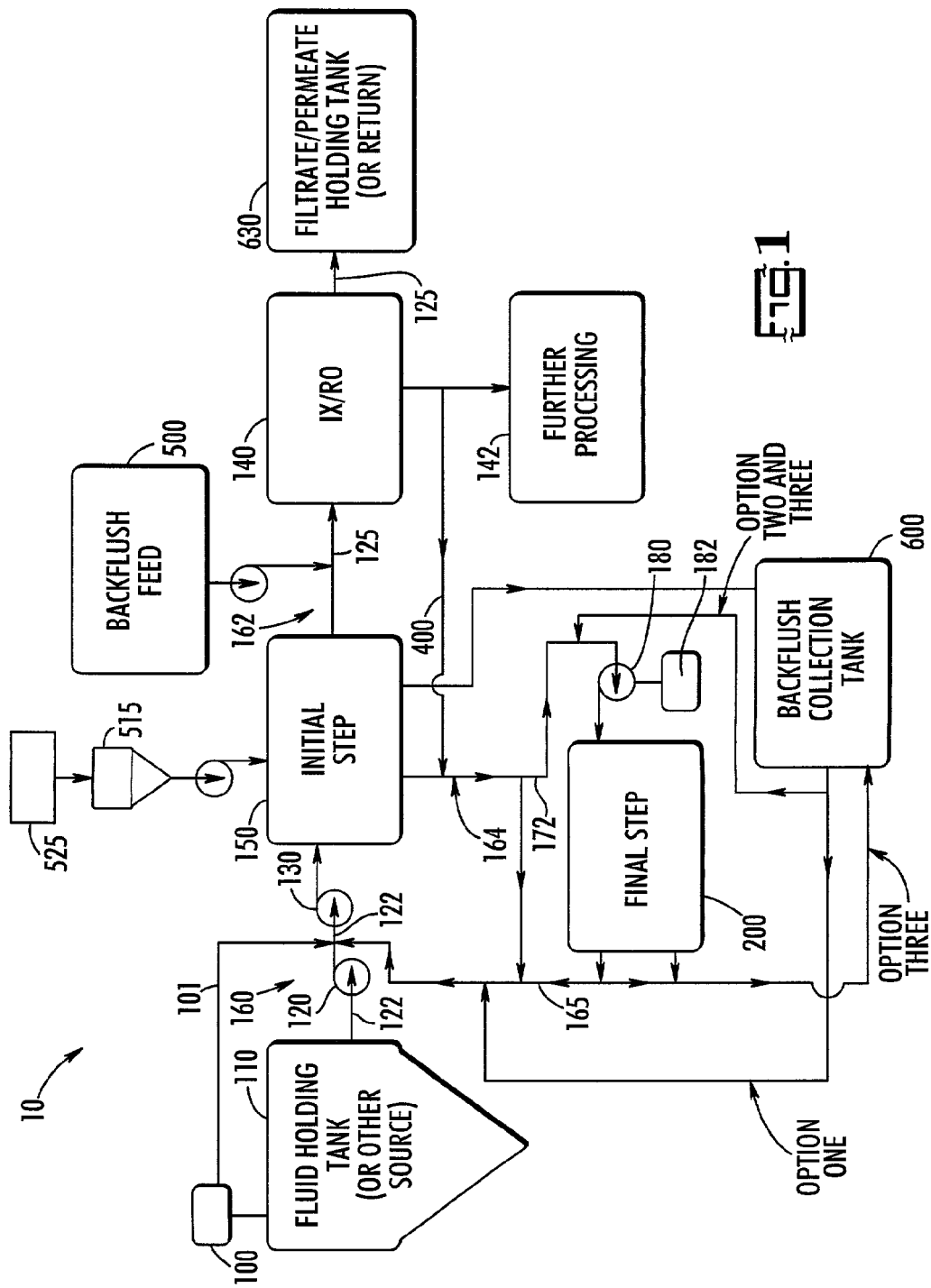
FIG. 1 is a schematic drawing of a single-stage two-step system for collecting substances from a fluid, according to a preferred embodiment of the present invention.

The present invention is a method, apparatus and system for processing fluid media in order to collect substances carried by such media. The fluid media of interest include, but is not limited to, waste streams from nuclear power plants, exhaust or other gases from power plants or other industrial, commercial, or municipal facilities, and fluid media associated with industrial, commercial, or municipal operations including, but not limited to: metal finishing and/or recovery operations; pharmaceutical compound synthesization or manufacture; ceramic production; hydrometallurgical and mining applications; coal cleaning; hydrothermal processing; mineral beneficiation; and biotechnical material or compound manufacture and/or collection. The present system, compared to the prior art processes, reduces the volume of unwanted materials collected without affecting the purity of the filtrate and/or the permeate, and it also simplifies the handling of the collected substances due to, among other items, the generation of a superconcentrate of such substances. In particular, the present invention is an improvement over the prior art processes because it introduces a method of using substance collection devices that produces a lower volume of waste, i.e., unwanted substances, from being collected while maximizing the collection of the substances of interest. Moreover, the substances of interest are collected in a highly concentrated form so that the collection volume of these substances is minimized as well. This, of course, simplifies the handling and reduces the costs associated with the disposal or recovery of the collected substances. For example, with respect to collecting radioactive contaminants from a fluid, the present system is able to significantly reduce the volume of the substances to be disposed of and, therefore, the associated disposal costs. Moreover, the present system may preclude the necessity of having to perform additional costly processing steps prior to the disposal or reuse of the collected substances and/or the release or reuse of the filtrate. Generally, the collection devices of the present invention are comprised of number of filtration media including, but not limited to screen filters, microfilters, ultra filters, nano-filters, and hyper filters (i.e., reverse osmosis membranes) that may be of the cross-flow or of the regularly backflushed dead-end type. Generally, when used herein, "reverse osmosis" or a "reverse osmosis membrane" is capable of retaining particles (and/or substances) having a size of about 0.0001 microns or larger including, but not limited to, ions, sugars, synthetic dyes, proteins, emulsions, viruses, carbon black, paint pigments, indigo dye, and/or bacteria. Generally, when used herein, a "nanofiltration membrane" is capable of retaining particles (and/or substances) having a size of about 0.0005 microns or larger including, but not limited to, ions, sugars, synthetic dyes, proteins, emulsions, viruses, carbon black, paint pigments, indigo dye, and/or bacteria. Generally, when used herein, an "ultrafiltration membrane" is capable of retaining particles (and/or substances) having a size of about 0.005 microns or larger including, but not limited to, proteins, emulsions, viruses, carbon black, paint pigments, indigo dye, and/or bacteria. Generally, when used herein, a "microfilter" is capable of retaining particles (and/or substances) having a size of about 0.05 microns or larger including, but not limited to, proteins, emulsions, viruses, carbon black, paint pigments, indigo dye, and/or bacteria. Furthermore, these devices generally have different operating pressure ranges. For example, the operating pressures range from about 10–40 psig for microfilters and ultrafilters to about 1000 psig for reverse osmosis membranes.

Figure 2:
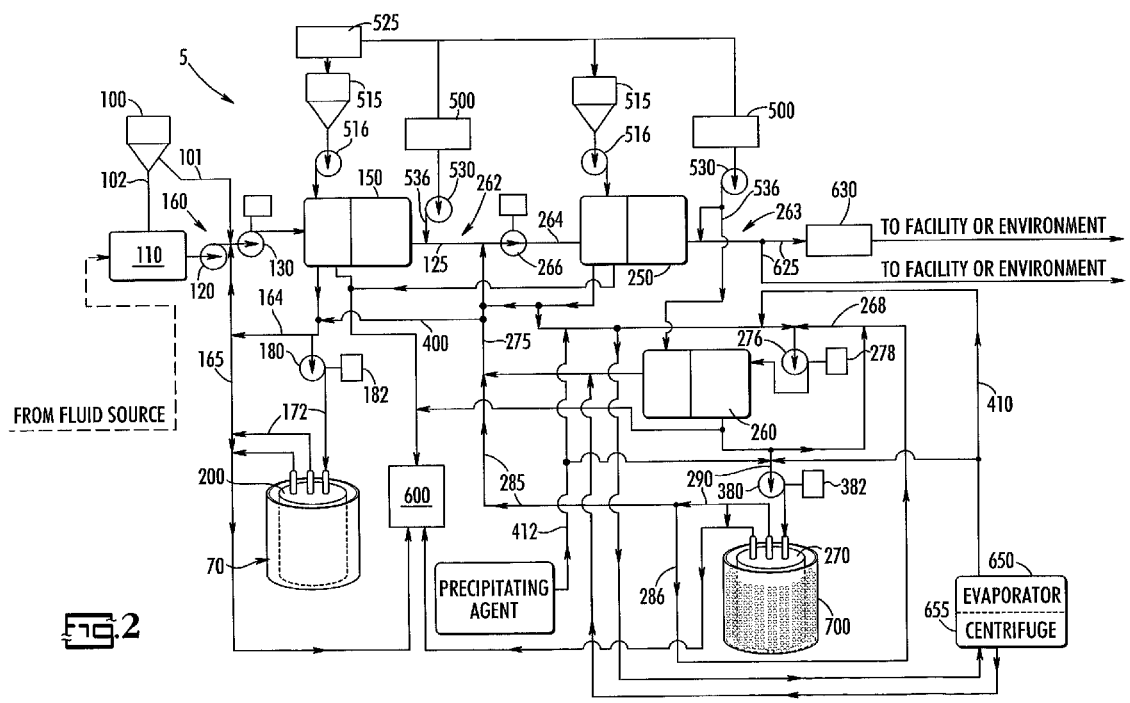
FIG. 2 is a schematic drawing of two-stage system for collecting substances from a fluid, according to another preferred embodiment of the present invention.
Figure 3:
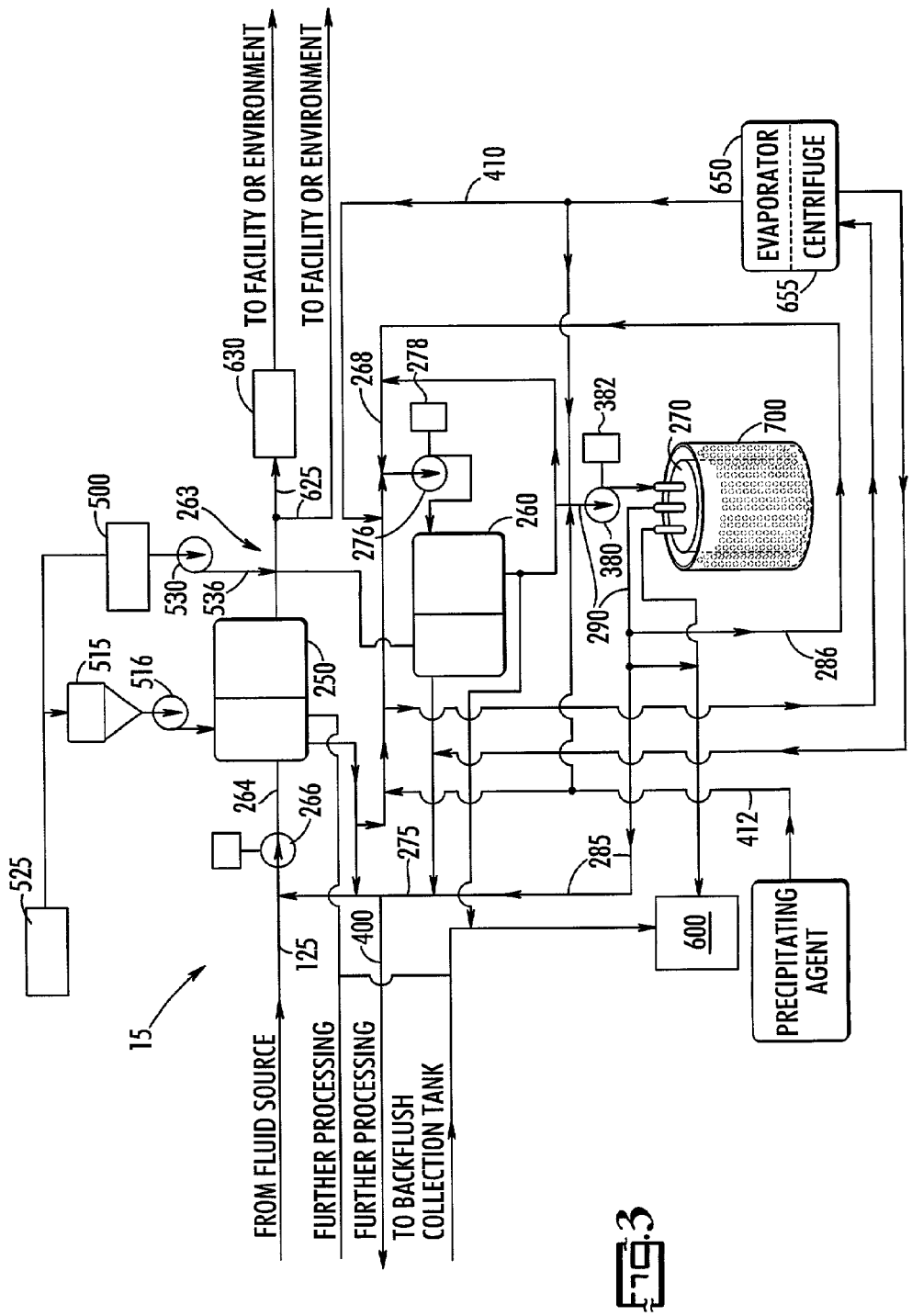
FIG. 3 is a schematic drawing of single-stage three-step system for collecting substances from a fluid, according to another preferred embodiment of the present invention.

A preferred embodiment of the present invention is illustrated in FIG. 1. As shown in FIG. 1, a source of fluid media carrying suspended and/or dissolved materials for processing by the present invention substance collection system 10 is shown as a fluid holding tank 110. The use of a fluid holding tank 110 is the preferred method of providing the source of fluid for the substance collection system 10 when used in a stand-alone configuration, and in some facility based applications. This, however, is not the only configuration that can be used for the present invention system 10 (or 5 or 15 as shown in FIGS. 2 and 3 respectively) and, since the substance collection system 10 has a relatively small footprint and can be easily configured and expanded to meet an individual facility's fluid characteristics or system configuration needs, the present invention system is capable of being set-up and operated in a very small open area at a variety of facilities. In other words, while two of the preferred embodiments are shown to be attached to a fluid holding tank 110, the fluid holding tank 110 is not always used and may be considered to be an optional component of the present system 10 (or 5), and the present system 10 (or 5 and/or 15 as shown in FIGS. 2 and 3, respectively) should be considered as being attachable to any appropriate source of a fluid medium including, but not limited to, being directly connected to a facility's fluid system. The fluid medium, which can include suspended particulate and/or dissolved materials including, but not limited to, metal ions, salts, bio-compounds, or other dissolved species, is preferably drawn from the fluid holding tank 110 (or source of the fluid medium) by a pump 120 if the feed pressure is insufficient, or taken directly from the tank 110 or other fluid source if the feed pressure is sufficient, and is then directed via a conduit 122 to a reject recirculation and recycle loop pump 130 which is in fluid connection with an initial step substance collection device 150. While the use of a pump is the preferred method of providing a driving force for the fluid throughout the present invention, other flow creating methods can be used including, but not limited to, those that use gravity, pressure and/or thermal differences, or those which involve rotating or spinning the filter elements. Preferably, the initial step substance collection device 150 (or 250 of a three-step system described in another preferred embodiment of the present invention, which is shown in FIGS. 2 and 3) is an ultrafiltration or a reverse osmosis membrane type filter; however, any other suitable mechanical or diffusion based substance collection device, i.e., filter element, can be used including, but not limited to, a nano-filter, a sintered metal filter, a microfilter, or any other substance collection device that can collect particles larger than about 0.0001 micrometer in size. The initial step substance collection device's suitability is based on, among other items, the characteristics of the fluid medium and of the substances to be collected along with a requirement that the particle collection size rating for the initial step substance collection device 150 (or 250) is preferably equal to or smaller than the particle collection size rating for the final step substance collection device 200 (or 270, and the intermediate step collection device 260 in the three-step system embodiment). When the term "particle" is used herein, it refers to both suspended solids as well as to dissolved ions or other dissolved species that are carried by the fluid, and can be precipitated out of the fluid or can be collected by appropriately sized filtration media, i.e., filter elements. When the term "substance" is used herein, it refers to a particular kind of matter or material to be collected that is generally composed of such particles. Moreover, when the term "substance" is used in either its singular or plural forms herein it can be construed as being either singular and/or plural depending on the context of usage and/or depending upon the application in which the present invention system is being used. Furthermore, the terms "permeate" and "filtrate," as used herein, should be construed as being interchangeable. Additionally, when used herein, the word "conduit" means a pipe or hose together with fittings, valves, flanges, and other associated piping and/or flow controlling components adapted for conveying the fluid that flows through it. Since the purposes for and the use of piping and flow controlling components are well known, with the exception of the piping, these other associated piping and/or flow control components are not generally shown in the figures. Some examples of valves that are not shown are isolation valves, which can be of a gate, ball, or any other design; check valves, which can be of a single-gate, double-gate or any other design, and valves used for throttling flow, which can include, but are not limited to needle valves. The flow controlling components can be of the type that are operated manually, and/or by controllers, which can include, but are not limited to, electromechanical, pneumatic, and/or hydraulic operators.

Prior to the fluid medium reaching the initial step substance collection device 150, a precipitating agent such as those that include a sulfur based molecule, e.g., a sulfide or sulfite, can be introduced into the fluid medium; however, any other agent that would be suitable for use with the fluid medium and/or the dissolved substances to be collected may also be used as well, including, but not limited to, pharmaceutical fabrication or synthesization agents, ceramic or metal recovery agents, other chemical agents, bacterial agents, biotechnical material or bio-compound agents, and/or any other agent that would be suitable for the recovery of valuable and/or useful substances. Therefore, any form of the terms "precipitating agent," "agent" or "reagent," or "chemical" can be considered to be interchangeable when any of these terms are used in the context of collecting the substances from the fluid media including, but not limited to, those substances such as contaminants, metals, dissolved species, substances associated with pharmaceutical fabrication or synthesization, biotechnical materials or bio-compounds, and/or any other valuable and/or useful substances that can be collected with the present invention system described herein. Preferably, a precipitating agent(s) holding tank 100 is attached to the fluid holding tank 110 in order to introduce the precipitating agent(s) into the fluid medium. The primary purpose of introducing the precipitating agent(s) is to cause the dissolved radioactive metal ions, non-radioactive metal ions, and/or any other dissolved species of interest in the fluid medium to be precipitated out of solution. For example, but not as a limitation, the metal ions can include cobalt, manganese, and iron, which will form metal sulfides when exposed to a sulfide-based precipitating agent that is introduced into the fluid. Other metals of interest may include, but are not limited to, gold, copper, uranium, and silver, which may be available for recovery from a variety of commercial applications including, but not limited to, leaching operations. Preferably, the precipitating agent(s) used will be comprised of biologically benign anions and cations, and the concentration of the precipitating agent(s) used will be selected to match the dissolved species concentration on a mole equivalent basis—with some excess in the feed to account for metal ion, and/or other dissolved species, level changes. Regarding the introduction and use of the precipitating agent(s), it is important and preferable to introduce the precipitating agent(s) sufficiently in advance of the initial step substance collection device 150 (which includes the possibility of introducing the precipitating agent(s) upstream of, or prior to, the fluid holding tank 110) so that the precipitating agent(s) has a chance to react with the dissolved species in the fluid medium prior to reaching the initial step substance collection device 150. Furthermore, the precipitation reaction may be improved through the use of agitation and/or stirring means, temperature control means, and/or pressure control means, which may be incorporated into the fluid holding tank 110 and/or the piping system leading to the initial step substance collection device 150.

The initial step substance collection device 150 is used to reject particles of about the same size and larger than its particle collection size rating, and, if the particle collection size rating is large enough, it will allow appropriately sized dissolved species to pass through it along with a portion of the fluid medium. Preferably, the filtrate (or permeate) from the initial step substance collection device 150 is forwarded via another conduit 125 back to the facility's fluid system, or to a filtrate/permeate holding tank 630 for sampling and/or storage prior to release to the environment or reuse. Optionally, an ion exchange polisher and/or a reverse osmosis unit 140 may be attached between the initial step substance collection device 150 and the filtrate/permeate holding tank 630 (or the facility's fluid system). Generally, the ion exchange polisher and/or a reverse osmosis unit 140 will allow purified fluid to pass through to the filtrate/permeate holding tank 630 (or back to the facility's fluid system) and will remove dissolved species not previously removed. More specifically, the filtrate and/or permeate from the ion exchange polisher and/or reverse osmosis unit 140 is forwarded via conduit 125 to the filtrate/permeate holding tank 630 where it can be sampled for purity and then reused or released to the environment if it meets release criteria (or the filtrate and/or permeate can be directly forwarded to the facility's fluid system). However, depending on the fluid medium and the substances of interest, the ion exchange polisher and/or reverse osmosis unit 140 may not be needed if, for a particular application, the present invention system, through its filter media selection, configuration and/or precipitation process used, is effective in removing a sufficient percentage of the dissolved species prior to the fluid passing through the initial step substance collection device 150 and entering conduit 125. The concentrates from ion exchange polisher and/or reverse osmosis unit 140 may then be forwarded for further processing 142 in accordance with the prior art method, or, preferably, they can be directed through conduit 400 to the recycle loop 164 where the concentrates of the ion exchange polisher and/or reverse osmosis unit 140 can be processed, and its constituent substances collected, by using the components of the present system as shown in FIG. 1.

While the present invention system can provide a filtrate (or permeate) fluid that would be releasable to the environment and/or reusable without the need for the ion exchange polisher and/or reverse osmosis unit 140, in some applications, however, the precipitation means and/or the filtration media are not efficient or are unable to collect a sufficient amount of the substance sought to be collected; therefore, the use of an ion exchange polisher and/or reverse osmosis unit 140, or the use of any of the other preferred embodiment to be described below, will be necessary to obtain the substance collection results sought to be achieved. When necessary to use an ion exchange polisher and/or reverse osmosis unit 140, or any of the other preferred embodiments to be described, the present invention system can be viewed as preferably having two separate processing portions or stages. Preferably, these stages will be a suspended substance collection stage and a dissolved substance collection stage, and while these stages are shown in FIGS. 1 and 2 as being physically combined in one apparatus it should be noted that the different substance collection stages can be operated as stand-alone systems, i.e., the stages can be operated in combination, in stand-alone configurations, or in some combination of both. While it is preferable that the stages are a suspended substance collection stage followed by a dissolved substance collection stage, any other suitable configuration of stages can be used as well.

Referring to FIG. 1, the following is a more specific description of the initial step substance collection device 150 and the two-step collection system and method. Through the use of pumps and/or piping and other associated components including, but not limited to, various types of valves, the fluid containing the substance, or substances, of interest is first directed as a feed stream 160 from the fluid holding tank 110 (or the fluid source) to the upstream side of the initial step substance collection device 150; where a portion of the fluid passes through the initial step substance collection device 150 as a filtrate and/or permeate stream 162 or 262, and a portion of the fluid along with a portion of the particles that are rejected or prevented from passing through the initial step substance collection device 150, i.e., reject (and/or concentrate), is directed to the final step substance collection device 200 for at least one additional processing step. Preferably, the additional processing step includes, but is not limited to: (1) using a recycle loop 164 to establish a high velocity flow across the upstream side surface(s) of the filtration elements of the initial step substance collection device 150 (preferably, the initial step substance collection device 150 has at least one ultrafiltration membrane) so that the reject (and/or concentrate) and the fluid form a reject recirculation stream carried by the recycle loop 164; and (2) diverting a portion of the reject recirculation stream carried by the recycle loop 164 into a substance collection flow path 172, which directs this fluid stream to and through the final step substance collection device 200 at a low flux. Along with the use of valves and/or other flow control devices, the velocity of the fluid in the recycle loop 164 is maintained through the use of a reject recirculation and recycle loop pump 130, and the flux through the final step substance collection device 200 is maintained by a pump 180 and a controller 182, which also causes the filtrate from the final step substance collection device 200 to be transported back to the recycle loop 164 through conduit 165 SO that it is returned for another pass through the initial step substance collection device 150. The velocity, or flux of the fluid passing through the final step substance collection device 200 is maintained very low to minimize the introduction of energy and to maximize the solids, i.e., substance, loading and the per pass efficiency of the final step substance collection device 200. Preferably, the flux, through the use of the pump 180, the controller 182, and possibly through the proper setting of valves and/or other flow control devices including, but not limited to, throttle valves, is set so that the flux is at the low end of the flux that would be required to maintain flow through the final step substance collection device 200. This will assure that the particles carried by the fluid in the substance collection flow path 172 can interact with each other and the filter elements in order to form a "cake" of particles on the upstream side of the final step substance collection device 200. This self-generated cake permits the fluid to flow through passages defined within it. These passages are highly irregular in cross-section and direction so that the flow of fluid through the cake matrix makes frequent changes in direction and speed, and, because of these varying flow characteristics, the matrix will tend to trap the small particles flowing with the fluid, and as the matrix grows larger it will become even more effective. In other words, the final step substance collection device 200, in combination with the low flux, collects, concentrates, and removes the fluid from the substances carried by the fluid.

At steady state conditions, $FC_F = RC_R E$, where F is the fluid feed rate to the initial step substance collection device 150; R is the fluid feed rate to the final step substance collection device 200; $C_F$ is the total suspended solids concentration in the fluid feed to initial step substance collection device 150; $C_R$ is the total suspended solids concentration in the fluid feed to the final step substance collection device 200; and E is the per pass removal efficiency of the final step substance collection device 200. Under the assumption that removal efficiency remains the same for a given particle size as the particle concentration changes after each pass, in equilibrium, the final step substance collection device 200 is close to 100% effective in trapping all particles in the fluid; however, on any pass, its removal efficiency can be lower than 100%, even much lower. For example, if the removal efficiency is 50% and the fluid contains 100 parts per million ("ppm") of solids, the first pass through the final step substance collection device 200 removes 50 ppm. The second pass through the final step substance collection device 200 removes an additional 25 ppm. The third pass removes another 12.5 ppm, and in ten passes 99.9% of the particulate is removed.

The final step substance collection device 200 of the present system has a particle collection size rating larger than or equal to that of the initial step substance collection device 150. Preferably, the initial step substance collection device 150 uses an ultrafiltration membrane type filter; however, any other suitable filtering element can be used in this substance collection device including, but not limited to, filters and/or membranes having a wide range of particle collection size ratings, a nanofilter, a reverse osmosis membrane, a sand or other fine particle filter, a sintered metal filter, and/or any other suitable filter and/or membrane device that may be of the cross-flow or of the regularly backflushed dead-end type. Generally, the suitability of the filter and/or the membrane used is determined by the properties of the fluid medium and the substances to be collected (e.g., substance size and/or chemical properties) and the requirement that it is preferable that the particle collection size rating of the initial step substance collection device 150 is equal to or smaller than the particle collection size rating of the final step substance collection device 200, and the further requirement that a filter cake can be formed on the final step substance collection device 200. In some applications, however, it may be preferable that the particle collection size rating of the final step collection device 200 is smaller that the particle collection size rating of the initial step substance collection device 150. Furthermore, the initial step substance collection device 150 can use more than one filter and/or membrane element in either a sequential and/or a parallel flow configuration for either or both the fluid feed flow 160 and recycle loop 164 flow paths.

Preferably, the final step substance collection device 200 is a microfilter type filter; however, any other suitable filtering element can be used in this substance collection device including, but not limited to, filters and/or membranes having a wide range of particle collection size ratings, an ultrafiltration membrane, a nanofilter, a reverse osmosis membrane, a sand or other fine particle filter, a sintered metal filter, and/or any other suitable filter and/or membrane device. Generally, the suitability of the filter and/or membrane used for the final step substance collection device 200 is determined by the properties of the fluid medium and the substances to be collected, e.g., substance size and/or chemical properties, and the requirement that it is preferable that the particle collection size rating of the final step substance collection device 200 is equal to or larger than the particle collection size rating of the initial step substance collection device 150, and the further requirement that a filter cake can be formed on the final step substance collection device 200. In some applications, however, it may be preferable that the particle collection size rating of the final step substance collection device 200 is smaller than the particle collection size rating of the initial step substance collection device 150 (or the intermediate step substance collection device 260 to be described later). Also, in some applications, the final step substance collection device and/or filter element(s) of the final step substance collection device 200 (or 270 in a three step embodiment) may need to be "pre-coated" and/or "seeded" (i.e., a material that acts as a seminal layer of, and/or as a catalyst or stimulus for, the formation of the filter cake, and/or for carrying a precipitating agent to provide another means to start or further enhance dissolved ion collection is introduced to the upstream side surface(s) of the filter elements of the substance collection device 200 (or 270 in a three step embodiment)). In other words, in some applications it may be necessary, or desirable, to pre-seed or pre-coat the final step substance collection device 200 (or 270 in a three step embodiment) with one or more materials well known in the field including, but not limited to, diatomaceous earth, powdered resins, activated carbon, or other granular materials; however, any other similar material that would be suitable for starting filter cake formation and/or dissolved species collection can be used to initiate the collection of the small substances including, but not limited to, colloidal substances. The use of this pre-coating can be particularly helpful if the substances contained in the fluid have a particle size that is close to or is smaller than the particle collection size rating of the substance collection device (for example, but not as a limitation, the particle collection size rating may be large and/or other factors may require that a material be loaded onto the upstream side surface of the filter elements to act as a catalyst or stimulus for filter cake formation). Furthermore, the final step substance collection device 200 can also use more than one filter and/or membrane element in either a sequential and/or a parallel flow configuration for the substance collection flow path 172 flow. Moreover, the final step substance collection device 200 can use a small cartridge type slip filter, or any other similar suitable filter that can be disposed of at a disposal site and/or be reused by backflushing.

Besides having a reject recirculation stream and a recycle loop 164, the usable surface area of the initial step substance collection device 150 (and the surface area of some of the other filtering elements to be discussed below) is maximized and the chemical cleaning requirements are minimized by backflushing. Generally, backflushing would be used to clean the filter elements of the initial step substance collection device 150 by removing materials deposited on their surfaces. However, backflushing also may be one of the methods used to recover the valuable, desirable, and/or useful materials collected by the final step substance collection device, and after backflushing, the final step substance collection device may be available for reuse in the present system. As an example, but not as a limitation, carbon dioxide, other gases, and/or volatile fluids can be used to backflush the collected materials from the filter element in order to recover and/or reuse such substances. Furthermore, the efficiency of backflushing can be improved by using a pump or by pressurizing the backflushing fluid to produce a high velocity reverse flow through the substance collection device 150 during backflushing, and/or by using the reject recirculation stream's high velocity flow across the upstream surface(s) of the filter elements of the initial step substance collection device 150. Any or all of these techniques should cause an increase in turbulent flow, which would cause the laminar flow layer across the surfaces of the filter elements to decrease, which may cause a more effective cleaning to occur, and which, relatedly, should increase the usable lifetime of the substance collection device being backflushed. Additionally, the effectiveness of backflushing and/or the cleaning of the filter elements of any of the substance collection devices may be improved by introducing chemical and/or bacterial cleaning agents into the backflushing fluid, and/or chemical, and/or bacterial, and/or mechanical cleaning agents into the reject recirculation stream, so that a more effective cleaning of the particulate from the laminar flow areas of the backflushed collection devices may occur. Moreover, efficiency may be improved by introducing air, ozone, or any other suitable gas, preferably under pressure, into the backflush fluid and/or into the reject recirculation stream carried by the recycle loop 164, and/or by using ultrasonic technology to dislodge substances from the filter elements. After performing backflushing, instead of directly processing the materials released from the filtering surfaces as a result of backflushing, in some applications, the materials may be collected and stored in a backflush collection tank, and later released back into the system for processing or disposed of externally through other means. Importantly, the method and manner in which substances are collected in the present invention provides for the recovery of substances that previously could not be efficiently and/or economically recovered by other systems, especially those using drying processes; thereby, enabling the recovery of these substances for the first time. For example, but not as a limitation, bio-compounds that cannot be thermally treated, e.g., by freeze-drying or evaporation, may be recoverable with the present invention system.

Referring to FIG. 2, another preferred embodiment of the present invention system is shown. This embodiment is a two-stage substance collection system 5 that uses the two-step collection system previously described, as a primary collection stage, as well as a three-step collection system as a secondary stage. As previously mentioned, this method is preferably used for substance recoveries where the substance sought is both dissolved and suspended, and precipitation and/or filter media selection is not efficient or sufficiently capable of reducing the amount of the dissolved substance to desired levels. Preferably, the two-stage collection system can be used to separate the collection of suspended and dissolved substance into two independent process stages. These stages can be operated in combination or as separate stand alone systems with or without the other stage, and, while the collection mechanism for the first substance collection stage is preferably different than the one used with the second stage, both use sequential substance collection devices and sequential filtering flow(s). This allows for the addition or introduction of specific treatment steps, which can be common to both stages, but, depending on the substances sought to be collected and/or the fluid medium, these treatment steps are not limited to this commonality. The second stage will now be described according to a preferred three-step embodiment; however, the second stage is not limited to this number of filter steps and any other number of steps or number of collection devices suitable for the substances sought to be collected and/or the fluid medium of interest can be used as well. Moreover, another embodiment of the present invention uses multiple intermediate step substance collection devices 260, each with its own separate means for introducing precipitating agents, which allows for the possible introduction of different agents, and each having its reject collected by a separate final step substance collection device 270. This provides for the possible simultaneous collection and/or recovery of multiple substances from the fluid. Therefore, while these components 260 and 270 (and the conduit 412 for introducing the precipitating agents and/or optionally conduit 410 for introducing the evaporator bottoms or concentrate of an evaporator 650 and/or the reject from a centrifuge 655) are shown as single components, it should be kept in mind that these components could be viewed as possibly mirrored multiples of themselves. Therefore, when using multiple filter steps, or multiple filter devices in a step, it also should be kept in mind that the user is provided with the flexibility of using different treatment processes with any or all of the different filters and/or filter steps being used. The flexibility of the present system is further illustrated by another preferred embodiment, which is shown in FIG. 3.

FIG. 3 shows that the three-step system may be used as a single-stage collection system as well, and, since the three-step system provides the basis for the embodiments shown in both FIGS. 2 and 3, the following description applies to the three-step system shown in both figures.

The three-step system uses an initial step substance collection device 250, an intermediate step substance collection device 260, and a final step substance collection device 270. The intermediate step substance collection device 260 has a particle collection size rating that is preferably equal to or larger than the particle collection size rating of the initial step substance collection device 250 and is preferably equal to or smaller than the particle collection size rating of the final step substance collection device 270. Preferably, the three-step system will be comprised of: an initial step substance collection device 250 that is comprised of a reverse osmosis membrane type filter and/or filtration unit; an intermediate step substance collection device 260 that is comprised of an ultrafiltration membrane type filter; and a final step substance collection device 270 that is comprised of a microfilter. However, any other suitable filtering elements can be used in these substance collection devices including, but not limited to, nanofilters, reverse osmosis membranes, sand or other fine particle filters, sintered metal filters, and/or any other suitable filters and/or membrane devices that may be of the cross-flow or of the regularly backflushed dead-end type. Additionally, as previously described, the use of "pre-coating" and/or "seeding" may be required or desired. Generally, the suitability of the filters and/or membranes used is determined by the properties of the fluid medium and the substances to be collected, e.g., substance size and/or chemical properties, and the requirement that the particle collection size rating of the initial step substance collection device 250 is preferably equal to or smaller than the particle collection size rating of the intermediate step substance collection device 260 and the particle collection size rating of the intermediate step substance collection device 260 is preferably equal to or smaller than the particle collection size rating of the final step substance collection device 270, and the further requirement that a filter cake can be formed on the filtering elements used in the final step substance collection device 270. In some applications, however, it may be preferable that the particle collection size rating of the final step substance collection device 270 is smaller than the particle collection size rating of the intermediate step substance collection device 260 and/or the initial step substance collection device 250, and/or the particle collection size rating of the intermediate step substance collection device 260 is smaller than the particle collection size rating of the initial step substance collection device 250. Furthermore, each of these substance collection devices 250, 260, and 270 can use more than one filter and/or membrane element in either a sequential and/or a parallel flow configuration for either or both fluid feed flow and recycle loop flow.

In operation, instead of having one reject recirculation stream and recycle loop 164 as previously described for the two-step system, there are two streams and two recycle loops 264 and 268, which are formed through the use of pumps and/or piping and other associated components including, but not limited to, various types of valves and flow control components. Preferably, as shown in FIG. 2, the source of the fluid medium containing the substances of interest is the filtrate (and/or permeate) of a primary collection stage, which is preferably the filtrate (and/or permeate) of the previously described initial step substance collection device 150; however, any other source of fluid media could be used including, but not limited to, other filtration systems, (e.g., other two-step and/or three-step systems), fluid holding tanks, or direct connections to a facility's fluid system (as shown in FIGS. 2 and/or 3). The fluid medium is first directed as a feed stream 262 from the fluid source to the upstream side of the three-step system's initial step substance collection device 250; where a portion of the fluid passes through that initial step substance collection device 250 as a filtrate and/or permeate stream 263 that is directed via conduit 625 to the filtrate/permeate holding tank 630 (where it can be sampled for purity and then reused or released to the environment if it meets release criteria), or the filtrate/permeate can be directly forwarded to the facility's fluid system, or it can be sent to another stage or system for further processing, including, but not limited to, another two-step or three-step substance collection system, a reverse osmosis unit, and/or an ion exchanger. The portion of the fluid that does not pass through the three-step system's initial step substance collection device 250 along with a portion of the particles rejected or prevented from passing through the three-step system's initial step substance collection device 250, i.e., reject and/or concentrate, is directed to the intermediate substance collection device 260 for at least one additional processing step. Preferably, this processing step includes, but is not limited to: (1) using a step-one recycle loop 264 to establish a high velocity step-one reject recirculation stream flow across the upstream side surface(s) of the three-step system's initial step substance collection device 250 so that the reject and/or concentrate ("reject") and the fluid form a step-one reject recirculation stream, which is carried by the step-one recycle loop 264; and (2) diverting a portion of the step-one reject recirculation stream into a step-two reject recirculation stream carried by a step-two recycle loop 268 to establish a high velocity step-two reject recirculation stream flow across the upstream surface(s) of the three-step system's intermediate step substance collection device 260 having, preferably, at least one ultrafiltration membrane, and, preferably, by introducing precipitating agents and/or by concentrating the reject that is contained in the diverted portion of the step-one reject recirculation stream, and/or by the selection of the proper particle collection size rating, the intermediate step substance collection device 260 is used to collect the substances of interest on the upstream surface of each of its filter elements. Preferably, the concentration of the reject in the diverted portion of the step-one reject recirculation stream is accomplished by directing this stream to an evaporator 650, a centrifuge 655, or to any other suitable concentrating device, before directing the concentrated fluid and/or concentrates to the intermediate step substance collection device 260. Preferably, therefore, at this point in the sequential filtering sequence, a portion of the fluid will pass through the intermediate substance collection device 260 as a filtrate (and/or permeate), and another portion of the fluid will pass across the upstream side surfaces of the intermediate substance collection device 260 and will remain in the step-two reject recirculation stream for further processing. To maintain the flows, the velocity of the fluid in the step-one recycle loop 264 is maintained through the use of a step-one recycle loop pump 266 and possibly a controller and/or the setting of valves and/or other flow control devices, and the velocity of the step-two recycle loop 268 is maintained through the use of a step-two recycle loop pump 276 and possibly a controller 278 and/or the setting of valves and/or other flow control devices including, but not limited to, throttle valves. The filtrate (and/or permeate) from the intermediate substance collection device 260 is then directed to the step-one recycle loop 264 through conduit 275 and returned for another pass through the three-step system's initial step substance collection device 250 while a portion of the step-two reject recirculation stream is diverted from the stream and is further processed by the three-step system's final step substance collection device 270 through the use of at least one additional processing step. Preferably, this additional processing step includes, but is not limited to, diverting a portion of the step-two reject recirculation stream flow carried by the step-two recycle loop 268 into the step-three substance collection flow path 290, which passes through the three-step system's final step substance collection device 270 at a low flux. The velocity and/or flux of the fluid through the three-step system's final step substance collection device 270 is maintained by a pump 380 and possibly a controller 382 and/or the setting of valves and/or other flow control devices including, but not limited to, throttle valves, which cause the filtrate from the three-step system's final step substance collection device 270 to be directed back to the step-two recycle loop 268 through conduit 286 for another pass through the three-step system's intermediate step substance collection device 260 (or is optionally directed back to the step one recycle loop 264 through conduits 275 and 285 for another pass through the three-step system's initial substance collection device 250 or it can be optionally directed back to a previous stage through conduit 400). In the manner and for the reasons previously described in association with the two-step system's final step substance collection device 200, the velocity or flux of the fluid passing through the three-step system's final step substance collection device 270 is maintained very low to maximize the solids (i.e., substance) loading and the per pass efficiency of the three-step system's final step substance collection device 270. Optionally, however, as previously mentioned, a portion of the fluid and reject in the step-one reject recirculation stream may first be directed to an optional evaporator 650, a centrifuge 655, or to any other suitable concentrating device, for precipitation/concentration of the substance to be collected prior to the fluid being directed to the intermediate step substance collection device 260 and then to the final step substance collection device 270. Afterwards, the concentrated fluid and/or concentrates from each concentrating device are then preferably directed to the step-two (or second) recycle loop 268 upstream of the intermediate step substance collection device 260, while the distillate of an evaporator 650 (or the corresponding clean stream of any other concentrating device being used) is preferably directed to the upstream side of the initial step substance collection device 250 and/or to a conduit 625 for release or reuse (if the distillate meets purity criteria). Preferably, the evaporator bottoms/concentrate and/or the distillate are sufficiently cooled after leaving the evaporator 650 and before being introduced back into the present system, and this cooling, if needed, can be accomplished through the use of any of a variety of standard cooling means including, but not limited to, condensers or heat exchangers.

In other words, the present method comprises having a fluid medium source containing substances to be collected. The fluid medium is directed to a first initial step substance collection device 150 of a two-step 10 collection system, or 250 of a three-step 5 or 15 collection system; a portion of the fluid passes through this first initial step substance collection device, possibly for further processing using another two-step and/or three-step substance collection system 5, 10, or 15, and/or an ion exchanger or reverse osmosis unit 140. The reject collected on the upstream side surface of this first initial step substance collection device 150 or 250 along with a portion of the fluid is carried by a first recycle loop 164 or 264. In a three-step substance collection system, a portion of this first recycle loop flow is diverted to a second recycle loop 268 having an intermediate substance collection device 260 (or optionally to an evaporator 650, a centrifuge 655, or to any other suitable concentrating device in order to concentrate the substance to be collected). A portion of the reject collected on the upstream side surface of this intermediate substance collection device 260 along with a portion of this fluid is carried by a second recycle loop 268 and is then diverted to a low flux substance collection flow path 290, which directs the fluid and reject carried in this flow path through the filtration medium of the final step substance collection device 270, which is able to form a filter cake on its upstream side filter surface. Similarly, in a two-step substance collection system 10, a portion of the first recycle loop 164 flow is directly diverted to a low flux substance collection flow path 172 and through the filtration media of the final step substance collection device 200, which is able to form a filter cake on its upstream side filter surface. In either a two-step or a three-step (or more step) substance collection system, the filtrate and/or permeate from each collection device that is in sequence with the initial step substance collection device is recycled back to the initial step substance collection device of their respective system, and/or is directed to a flow path associated with a previous step's, or a previous system's, substance collection device(s) for further processing through intra-stage and/or inter-stage recycling, for example, but not as a limitation, by using the conduit 400 shown in FIGS. 2 and 3. Additionally, in either a two-step 10 or a three-step (or more step) system 5 and/or 15, it is possible to inject or add precipitating agents and/or other processing chemicals at almost any location on the collection system. For example, but not as a limitation, precipitating agents can be added to the feed to the second recycle loop 268 in a three-step system through a conduit 412 as shown in FIGS. 2 and 3. Also, as previously mentioned, the reject from, and the fluid not passing through, the initial step substance collection device 150 or 250 may first be sent to an evaporator 650, a centrifuge 655, or to any other suitable concentrating device in order to concentrate the substances to be collected prior to being directed to a subsequent stage in the sequence of filtering stages.

Preferably, the capability of backflushing the initial step collection devices and/or intermediate step collection devices will be provided as shown in FIGS. 1, 2 and 3. Backflushing, as previously described, is performed to remove materials deposited on the upstream surfaces of the substance collection devices in order to maximize the usable surface area of the filtering elements and/or the filter. Backflushing efficiency can be improved by using a pump, or by pressurizing the backflushing fluid, to produce a reverse flow having a high velocity through the filter elements of the substance collection devices during backflushing. Efficiency may be further improved by using the recycle loop to form a high velocity recirculating reject stream flow across the upstream side surface of the substance collection device, which may be further enhanced by introducing air or ozone, or any other suitable gas, preferably under pressure, either into the backflush fluid or into the recirculating reject stream. The recirculating reject stream, along with many of these other enhancing methods described herein, which can also be used with the presently described embodiments, improve backflushing effectiveness by increasing turbulent flow and, thereby, causing the laminar flow layer across the surface of the filtering elements to be decreased. This provides a more effective cleaning, which increases the usable lifetime of the backflushed substance collection devices. Additionally, the effectiveness of backflushing and/or cleaning of the substance collection device's surfaces may be improved by introducing chemical and/or bacterial cleaning agents into the backflushing fluid, and/or chemical and/or bacterial and/or mechanical cleaning agents into the recirculating reject stream, which may cause a more effective cleaning of the particulate from the laminar flow areas of the collection device. Moreover, ultrasonic means can be used alone or in combination with the above-described cleaning methods, and, if the proper combination of cleaning methods for the substances to be collected, the fluid media, and/or the filter elements is used, the cleaning results can be effectively amplified. For example, but not as a limitation, the use of ultrasound impacts on or causes the formation of gas bubbles, which causes the colloids (even those trapped by the filter elements) to vibrate, and can increase the mechanical chemical and/or bacterial efficiency of the mechanical, chemical, and/or bacterial cleaning agents that are used.

Preferably, to perform backflushing, filtrate and/or permeate from a initial step and/or intermediate step collection device is stored in a backflushing feed tank 500, a chemical hopper 515 and pump 516 can be used to add cleaning agents, and a source of pressurized gas 525 and/or a back flushing pump 530 can be used for the backflushing purposes previously described. Additionally, besides using collection system filtrate and/or permeate for a source of backflushing fluid, demineralized and/or deionized water and/or other fluids outside the collection system, and/or gas/water mixtures can also be used to remove particulate. Furthermore, the introduction of ozone can be used to provide membrane cleaning, especially when fouled by organic materials. However, since the backflush feed tank 500 can be filled with filtrate and/or permeate from a substance collection device, the need for supplying demineralized and/or deionized water for back flushing is reduced or eliminated. The backflush feed tank 500 will feed backflush fluid through a conduit 536 to the downstream side of collection device being cleaned 150, 250, and/or 260 during the backflush cycle, and after the backflush fluid passes through the collection device being backflushed, it can be collected in a backflush collection tank 600. The contents of the backflush collection tank 600 can then be processed to remove suspended solids or dissolved materials. Generally, this is accomplished by using one of three optional methods for feeding the contents of the backflush collection tank 600 back to the system, as shown with reference to the system 10 of FIG. 1. Option One is to feed the contents of the backflush collection tank 600 to the initial step recycle loop 164 (or 264). Option Two is to feed the contents of the backflush collection tank 600 to the final step collection flow path 172 (or 290). Option Three is basically a batch-wise process option, in which the final step substance collection device 200 (or 270) is isolated from its system 10 (or 5 and/or 15) and is used to form a fluid loop with the backflush collection tank 600 so that the contents of the backflush collection tank 600 are recycled through the final step substance collection device 200 (or 270) for as long as the user desires. However, if desired, the contents of the collection tank 600 may be externally processed or disposed of as well. While these options are the preferable methods of processing the contents of the backflush collection tank 600, any other suitable method can also be used.

Generally, in operation, the substances collected on the final step substance collection device 200 or 270 will cause the pressure drop across the final step substance collection device 200 or 270 to increase, and, when the maximum allowable differential pressure drop across the device is reached, or the final step substance collection device 200 or 270 is filled with substance, and/or other limiting criteria are reached, the final step substance collection device 200 or 270 and/or its filter elements will be replaced with a new or recycled final step substance collection device 200 or 270, and/or filter elements. Related to this, when collecting radioactive contaminants, the final step substance collection device 200 or 270 will be replaced when the maximum allowable radiation dose rate, activity level, safe mass levels, and/or other limiting criteria are reached. Preferably, prior to replacement, the substances collected and/or the collection device 200 or 270 will have excess fluid removed as described herein.

Preferably, after collecting the substances carried by the fluid, excess fluids are removed from the final step substance collection device 200 or 270. As background for fluid removal in the present two-step or the three-step (or more step) substance collection system, the filter cake forming filter is preferably contained within the final step substance collection device 200 or 270, which can be operated at normal system pressures while attached to the present invention system, which, in turn, allows for fluid removal through pressurization of the final step substance collection device 200 or 270. This is in contrast to those prior art systems that use filters and collection devices that cannot withstand pressurization, and which obtain fluid removal by suctioning off the fluids at pressures below atmospheric pressure. Therefore, since the present invention system can be pressurized, it can be operated at differential pressures that are much higher than those that can be used for systems that rely on suction-type dewatering. This provides for a higher solids loading, i.e., a higher concentration of solids, on the present invention's filter elements and/or for quicker fluid removal.

Preferably, the fluid removal process used with the present invention can be accomplished by using pressurized air, or some other suitable, and preferably inert, gas, which Applicant believes is more effective and/or efficient than the standard practice of suction dewatering. The use of pressurized fluid removal also results in: (1) the elimination of the equipment required for suction-type dewatering, which lowers the space required for the present invention; (2) less maintenance being required; (3) faster operations, which decreases the amount and/or magnitude of exposure that a worker would have to radioactive, toxic, and/or hazardous materials (in comparison to standard suction-type dewatering); (4) a higher substance of interest concentration; and (5) cost savings in equipment and labor. The fluid removal processes used with the present invention can also be performed and/or enhanced through the introduction of expandable materials such as expandable foams into any of the void spaces in order to displace the fluids, or through the filling of such void spaces with adsorbent materials and/or disposable materials including waste products. During or after fluid removal, the substances collected by the final step substance collection device 200 or 270 can be processed by backflushing, if appropriate, to remove the substances from the collection device so that it may be reused, or the collected substances can be processed by using prior art methods, or they may be disposed of directly along with the final step substance collection device 200 or 270, if desired.

Figure 4:
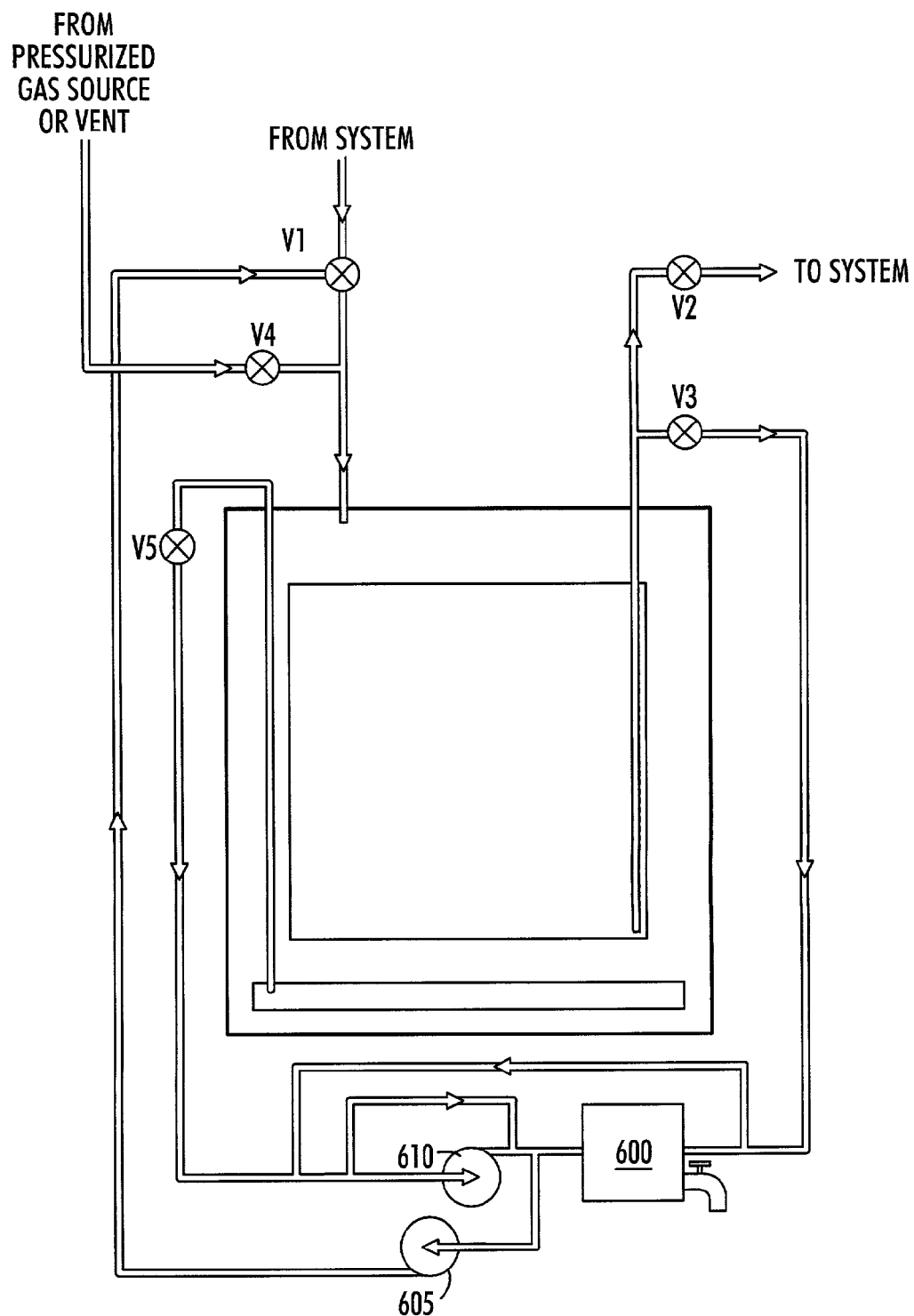
FIG. 4 is a schematic drawing of a final step substance collection device, according to a preferred embodiment of the present invention.

Referring to FIG. 4, preferably, in operation of the fluid removal process, the substance collection fluid flow path to the final step substance collection device 200 or 270 is isolated by shutting valve V1, which may be a three-way valve, and the final step substance collection device's filtrate flow path is isolated by shutting valve V2, and the first fluid removal flow path is opened (preferably, the first fluid removal flow path's conduit is attached to the final step substance collection device's filtrate flow path between an isolation valve V2 and the final step substance collection device 200 or 270). A source of pressurized gas is then placed in-service by opening valve V4, and the pressurized gas is used to pressurize the headspace of the final step substance collection device 200 or 270 to displace a portion, or all, of the fluids contained within the substance collection device 200 or 270. When evidence is obtained that gas is entering the first fluid removal flow path, the second fluid removal flow path is opened by opening valve V5 and the first fluid removal flow path is then isolated by shutting valve V3. The conduit for the second fluid removal flow path is attached directly to a fluid removal conduit contained within substance collection device 200 or 270, and is preferably connected to a separate fluid removal filter on or near the bottom of the substance collection device 200 or 270, for example a horizontal sheet filter may be used. The fluid removal process is terminated when gas is detected entering the second fluid removal flow path conduit. As shown in FIG. 4, the fluid removed from the final step substance collection device 200 or 270 is preferably directed to the backflush collection tank 600; however, this fluid can be directed to any other suitable location including, but not limited to, facility drains. Performing fluid removal in this way provides the user with a higher concentration of the substances of interest, the processing of a greater volume of fluid containing the same concentration of such substances, and/or a much quicker and/or more efficient fluid removal. Also as shown in FIG. 4 are two pumps 605 and 610. Pump 605 is a backflush recirculation pump 605 and is normally used to reprocess the contents of the backflush collection tank 600, while pump 610 is an optional fluid removal vacuum pump 610, which can be used to remove fluids from the final step substance collection device 200 or 270 by suctioning them from the final step substance collection device 200 or 270.

Preferably, the final step substance collection device 200 or 270 is carried within an optional Multi-Purpose Container 70 or 700 while attached to the present invention system. Preferably, the Multi-Purpose Container 70 or 700 is dimensioned to readily carry the final step substance collection device 200 or 270 and is fabricated of a material suitable for the application in which the present invention system is being used. For example, when used to receive radioactive wastes the Multi-Purpose Container 70 or 700, may be fabricated of a cross-linked polyethylene suitable for handling, transporting, and/or disposing of such waste. Preferably, the Multi-Purpose Container 70 or 700 is a container that is certified to meet the industry-based and/or governmental requirements imposed on containers of this type when they are used for the purposes described herein. Additionally, the Multi-Purpose Container 70 or 700 ("MPC") is a combination processing enclosure, transport container, and/or disposal container for the final step substance collection device 200 or 270 and/or the filter cake and the filter cake forming filter used in the final step substance collection device 200 or 270, and provides the present invention system with expanded processing and/or fluid removal features over the prior art.

The design of the present system not only allows for pressurized fluid removal of a possibly disposable substance collection device while still being attached to the present invention system, which may be carried within a MPC, but it also allows for the introduction of expanding agents such as foams instead of gas. The possible use of foam, introduced into the headspace at the top of the substance collection device 200 or 270, will, due to its expansion, squeeze fluids out of the filter cake and/or the substance collection device 200 or 270, which can provide a very efficient method of fluid removal. Related to this, the present invention can also use agents, similar to those used in fire extinguishers, which can be introduced into the substance collection device 200 or 270 and then activated at the end of the substance collection device's 200 or 270 lifecycle. This would allow a substance collection device 200 or 270 to be able to undergo fluid removal in circumstances where the use of suction dewatering and/or pressurized fluid removal equipment is unavailable and/or impractical. Preferably, if the collected substances are destined for disposal, the substance collection device 200 or 270 is dimensioned to be carried within the MPC 70 or 700, and, to reduce costs (especially disposal costs) the void spaces within the substance collection device 200 or 270, and/or between the substance collection device 200 or 270 and the MPC 70 or 700, can be filled with a void filling material, which is preferably an inert material that can flow into the void such as used resins. As a result, since a characteristic of the filter cake is that it is practically devoid of excess fluid and other volume increasing constituents (other than the substances of interest), the substances collected and/or the collection device 200 or 270 could possibly be prepared for disposal or recovery without the need for solidification and/or thermal processing. And, as previously described, all of the fluid removal processes, aside from transportation and disposal, can be done while the substance collection device 200 or 270 and/or the MPC 70 or 700 are in place on the present invention system and on-site, and not as a separate external process. On the other hand, the present invention's flexibility also allows for all of the processes, methods, techniques, and/or portions of the present invention system as explicitly or implicitly described herein to be performed and/or provided individually on a stand-alone basis as well as in the combinations explicitly or implicitly described herein. Importantly, the method and manner in which substances are collected in the present invention provides for the recovery of substances that previously could not be efficiently and/or economically recovered by other systems, especially those using drying processes; thereby, enabling the recovery of these substances for the first time. For example, but not as a limitation, bio-compounds that cannot be thermally treated, e.g., by freeze-drying or evaporation, may be recoverable with the present invention system.

As examples of the system's flexibility, but not as a limitation, the present invention system can be used for a variety of applications including, but not limited to, enhancing chemical reactions, such as in the precipitation of dissolved metals, and providing an alternative to "fluid bed processing" and its associated risks, which can include the release of and/or the exposure to fine toxic and/or radioactive materials. As background, and generally, when a precipitating agent (or precipitation reagent)—whether sulfide, hydroxide, or phosphate based—is introduced into a fluid, the precipitation process generally proceeds in two stages. The first stage is nucleation, wherein ultrafine, stable crystalline structures are formed. These structures, in some cases, such as hydroxide precipitation, are virtually impossible to filter and cannot undergo effective fluid removal processing (e.g., dewatering). The resulting stable suspension of crystallites can be broken down by digesting the suspension thermally for an amount of time that can last anywhere between several minutes to more than several hours, depending on the characteristics and the constituents of the starting suspension. During this thermal processing, some of the formed crystallites dissolve and re-precipitate forming seed particles, which are able to grow into larger, easier to collect, particles that can filtered from the suspension and can then undergo fluid removal (or dewatering). The second stage is a growth stage, in which further precipitation further grows the nucleate seed particles, and, consequently, results in much larger precipitates, which allows for a much more effective filtering, and/or fluid removal (or dewatering).

One way to "by-pass" nucleation is to add "seed" particles of the final compound (i.e., the substance intended to be collected) such that the precipitates hit the growth phase directly. This is particularly important for hydroxide precipitation where rapid nucleation normally precludes this process from using fluid removal processing (or dewatering) due to the stable suspension formation. Importantly, this "by-pass" can be accomplished in the present invention system by injecting precipitant(s) into the present invention's recycle loop or by injecting the precipitant(s) into the precipitating agent(s) holding tank 100, preferably under agitation, which would allow seeds to form in the holding tank 100, and then feeding a portion of the seeded contents of the holding tank 100 to the recycle loop 164 through conduit 101, in either case causing a sufficient amount of seed particles to be introduced into the system. After a sufficient concentration of seed particles is obtained in the recycle loop 164, the fluid containing the substances of interest will be introduced to the recycle loop 164 from another fluid source, which is preferably holding tank 110; however, any other suitable source of fluid could be used. The substance of interest will then be removed from this fluid and collected by the final step substance collection device 200 and/or 270. This is made possible because the design of the system, with its high turbulence (from form drag, if from no other source, and/or from its high flow rates) will give good mixing and promote an even precipitant concentration, which would enable even the use of the hydroxide reagents in recovery operations and would achieve the type of control over the concentration field normally only found in fluidized beds—except that with the present invention system solids entrainment would not be a problem, whereas entrainment is a troublesome issue for fluidized beds.

In this regard, while fluidized beds generally can be said to have sufficient control of temperature and/or composition fields, which, arguably, gives them better overall process control then other prior art systems, the present invention system is an improvement over fluidized beds. For example, in fluidized beds, process liquids/fluids are filtered for solids recovery prior to discharge, and product gases may be filtered, condensed, scrubbed, or otherwise processed for product recovery (oftentimes the off-gas train may be as simple as a train of high efficiency cyclones, possibly, with a baghouse as a backup). In processing radioactive or biologically active materials, however, the activity of the contaminants (particularly in the case of radioactive materials) significantly lowers the limits of detection. This causes a significant and expensive increase in the effluent treatment system required for the operation of an environmentally safe fluidized bed system. On the other hand, the use of the present invention system, with all of the discharge coming as filtrate/permeate from the initial step substance collection device 150, virtually eliminates the need for an extensive effluent treatment system while providing the benefits of improved process control. In summary, whereas the present invention system's filtration characteristics provide the opportunity to both improve the quality of all fluid/liquid discharge streams and minimize the volume of any secondary waste that is generated, the present system's flexibility also establishes the present invention system as a chemical reactor that, as a example, provides a very effective precipitation step in the case of the present invention system. Furthermore, due to its comparable process control characteristics but without the problem of solids entrainment, the present invention system offers an effective alternative to processing by fluidized beds.

Figure 5:
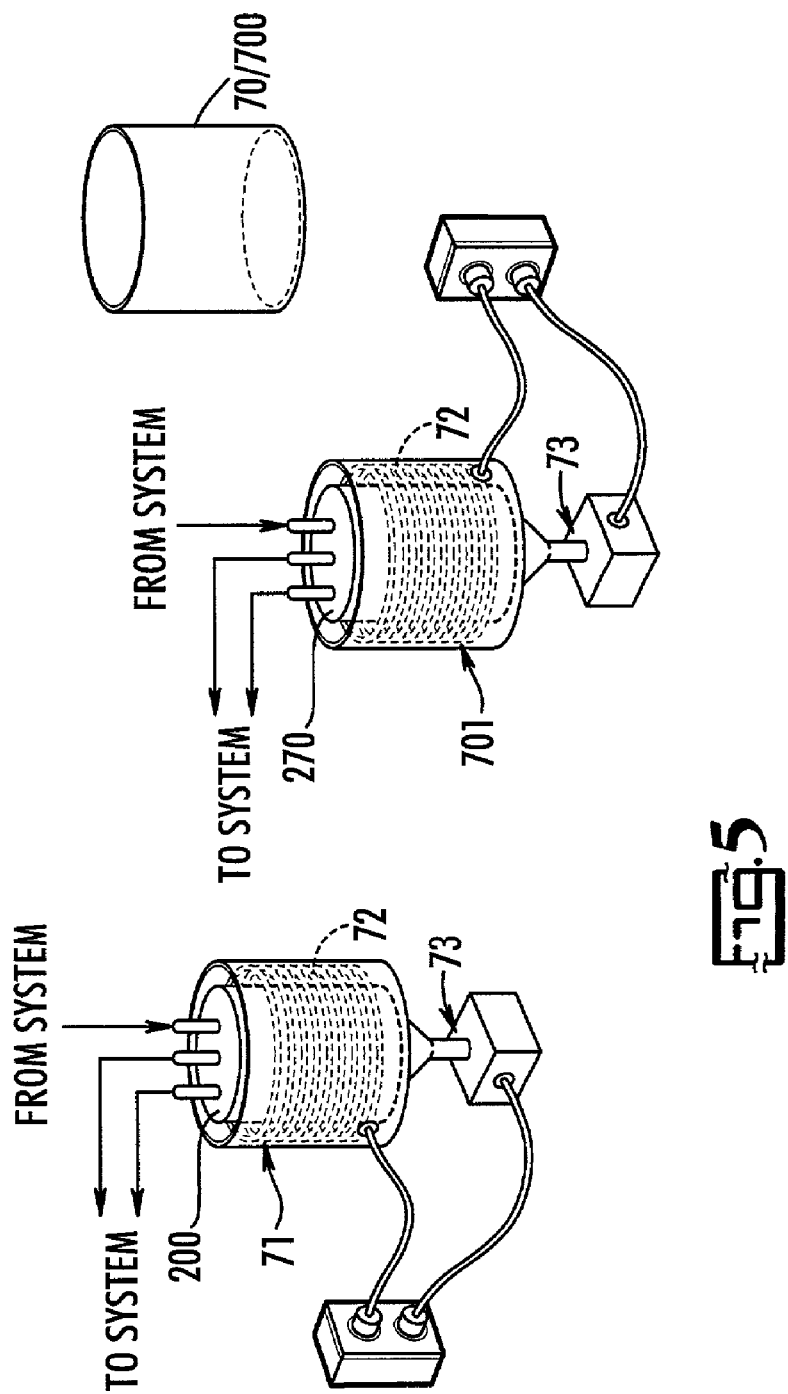
FIG. 5 is a schematic drawing of a modified multi-purpose container used for post-collection processing, and a standard multi-purpose container, which can be used to carry and store a final step substance collection device after post-collection processing, according to another preferred embodiment of the present invention.

Even though the present invention system does not require the use of thermal processing to prepare the substances collected by the final filter for recovery or disposal, as another example of the present invention system's flexibility, but not as a limitation, the present invention system can be used in applications in which fluid removal (or dewatering) is inadequate, for example, in cases where higher-level waste forms are collected, such as some radioactive wastes, which may require the solidification of such waste forms. In this regard, and optionally, the present invention system also can be used for reactor waste form stabilization, and for the stabilization of other wastes including, but not limited to, other radioactive, hazardous, toxic, and/or any other similar wastes. One reason for this, as previously described, is that the final step substance collection device 200 or 270 can be used as the final disposal receptacle for the collected substance, e.g., radioactive waste, (with or without the use of an MPC 70 or 700), and, therefore, can be used as a base for a stabilization system. Preferably, when used for such applications, the substances collected in the final step substance collection device 200 or 270 can form a composition that is compatible with solidification and/or vitrification. Preferably, this can be accomplished by injecting, in the manner previously described with respect to introducing precipitating agents into the system, a reagent into the recycle loop 164, such as a grout or a silicate-based material (e.g., sodium, and/or other silicate-based compounds including sand can be used as a filler and/or a glass former), which would be particularly useful with oxide or hydroxide particles in order to bind-up the contaminants (i.e., waste). By using the silicates and sand as glass formers, heat would be applied until solidification and/or vitrification occurs. Preferably, heating of the waste and/or the other materials present is accomplished by using electrical resistance elements and/or electrodes with the final step substance collection device 200 or 270 to supply joule heating to the contents of the final step substance collection device 200 or 270, or through the introduction of microwave energy. In the case of using microwave energy, the microwave energy frequency would be tuned to optimize coupling with any oxide, hydroxyl, silicate or other receiving compound in the mixture. While these are the preferred methods for stabilizing the collected substances, any other suitable chemical and/or agent can be used to form the composition to be solidified and/or vitrified, and/or any other source of heat can be used. Furthermore, the heat source may be integrated into or used in combination with a modified MPC 71 and/or 701 (as shown in FIG. 5) and/or into the final step substance collection device 200 or 270. Referring to FIG. 5, for example, and preferably, the modified MPC 71 and/or 701 will carry the final step substance collection device 200 or 270, which will be attached to the system, and may have annular heating elements 72 located on or in contact with the modified MPC's 71 and/or 701 interior surface, which then may be used to effectively conduct heat into the final step substance collection device 200 and/or 270. After solidification and/or vitrification of the collected substance, the final step substance collection device 200 and/or 270 and, therefore, the collected substance can be removed from the system and the modified MPC 71 and/or 701, and then secured within a standard MPC 70 and/or 270 for transportation and disposal. With respect to using microwave energy, a modification allowing for a single or a multi-port magnetron or other source of microwave energy can be incorporated into the design so that it is an integral part of or used in combination with a modified MPC 71 and/or 701. For example, and preferably, a microwave generating unit 73 attached to or used in combination with a modified MPC 71 and/or 701 can direct microwave energy into the final step substance collection device 200 and/or 270, which will be constructed of a material that will allow the microwave energy to pass through the material with no, or very little, absorption of the microwave energy, such as some glasses, ceramics, and plastics (also as shown in FIG. 5; however, and preferably though, both sources of heat are not simultaneously attached to and/or in contact with the modified MPC 71 and/or 271). After solidification and/or vitrification of the collected substance, the final step substance collection device 200 and/or 270 and, therefore, the collected substance can be removed from the system and from the modified MPC 71 and/or 701, and then secured within a standard MPC 70 and/or 270 for transportation and disposal. (While these are the preferred methods for solidifying and/or vitrifying the collected substance and for disposing of the collected substance and the final step substance collection device 200 and/or 270, any other suitable method for solidifying and/or vitrifying, and disposing of the collected substance can be used including, but not limited to, any other type of energy suitable for transmission from the modified MPC 71 and/or 701, the standard MPC 70 and/or 700, and/or for the transmission of the energy directly into the final step substance collection device 200 and/or 270, for example, but not as a limitation, by inserting, preferably disposable, electrodes into the final step substance collection device 200 and/or 270 and/or into the collected substances.) Since very high temperatures may be required to vitrify the substances collected, the materials used to fabricate the final step substance collection device 200 and/or 270 (and/or the MPC 70 or 700) would have to be compatible with the temperatures used. For example, but not as a limitation, high temperature polymers and/or steels may be used. By being able to use the present invention system in this manner makes the present invention system very appealing to those entities producing higher activity wastes, such as those found on DOE sites, for which simple fluid removal (or dewatering) is inadequate.

It will be apparent to those skilled in the art of fluid processing that many modifications and substitutions may be made to the foregoing detailed description without departing from the spirit and scope of the present invention, which is defined by the appended claims.

We claim:

1. A two-stage fluid treatment system for collecting substances carried by a fluid said system comprising:
    a first filter having a first upstream side, a first down stream side, and a first particle collection size rating, said first upstream side of said first filter being in fluid communication with a source of fluid, wherein upon contact with said first filter, said fluid is divided into a first filter filtrate and a first filter reject, said first filter reject containing particulate and dissolved substances;
    a first stage recycle loop in fluid communication with said first filter and adapted to carry a first stage reject recirculation stream, said first stage reject recirculation stream adapted to receive said first filter reject;
    means for directing and controlling said first stage reject recirculation stream;
    a second filter in fluid communication with said first filter and said first stage recycle loop, said second filter having a second upstream side, a second down stream side, and a second particle collection size rating that is no smaller than said first particle collection size rating, wherein said second filter is adapted to receive said first filter reject from said second upstream side, wherein upon contact with said second filter, said first filter reject is divided into a second filter filtrate and a second filter reject, said first stage recirculation stream adapted to receive said second filter filtrate from said second down stream side;
    a sequential step fluid filtering system in fluid communication with said first filter, said sequential step fluid filtering system comprising:
    an initial filter, said initial filter having an initial filter particle collection size rating;
    an intermediate filter, said intermediate filter having an intermediate filter particle collection size rating that is no smaller than said initial filter particle collection size rating;
    a final filter, said final filter having a final filter particle collection size rating that is no smaller than said intermediate filter particle collection size rating, wherein said initial filter is adapted to process said first filter filtrate, said first filter filtrate being divided into an initial filter filtrate and an initial filter reject upon contact with said initial filter, wherein said intermediate filter is adapted to process said initial filter reject, said initial filter filtrate being divided into an intermediate filter filtrate and an intermediate filter reject upon contact with said intermediate filter, and wherein said final filter is adapted to process said intermediate filter reject, said intermediate filter filtrate being divided into a final filter filtrate and a final filter reject upon contact with said final filter; and
    a first filter reject cake connected to said second filter that is formed by the agglomeration of said particulate on said second filter upstream side, wherein said directing and controlling means is adapted to direct a portion of said first stage reject recirculation stream through said second filter at a flux low enough to just pass through said second filter so as to form said first filter reject cake.

2. The system as recited in claim 1, wherein said first filter is an ultra filter.

3. The system as recited in claim 1, wherein said second filter is a micro filter.

4. The system as recited in claim 1, wherein said initial filter is a reverse osmosis unit.

5. The system as recited in claim 1, wherein said initial filter is an ion exchange polisher.

6. The system as recited in claim 1, wherein said intermediate filter is an ultra filter.

7. The system as recited in claim 1, wherein said final filter is a micro filter.

8. The system as recited in claim 1, further comprising means for backflushing said first filter that is in fluid communication with said first filter, wherein said backflushing means includes a backflushing fluid.

9. The system as recited in claim 8, further comprising means for collecting said backflushing fluid that is in fluid communication with said backflushing means.

10. The system as recited in claim 9 means for directing said backflushing fluid that is in fluid communication with said backflushing means, wherein said backflushing fluid directing means is adapted to direct said backflushing fluid to and from said backflushing collecting means.

11. The system as recited in claim 1, further comprising means for introducing a precipitating agent that is in fluid communication with said first stage reject recirculation stream, said precipitating agent capable of precipitating said dissolved substances so as to facilitate the formation of said first filter cake.

12. The system as recited in claim 1, where said first filter is pre-coated with a material for the promotion of the formation of said first filter cake.

13. The system as recited in claim 1, further comprising means for establishing a high velocity flow of said fluid across said first filter upstream side of said ultra filter.

14. The system as recited in claim 1, further comprising means for establishing a high velocity flow of said first filter filtrate across the upstream side of said initial filter.

15. The system as recited in claim 1, further comprising means for establishing a high velocity flow of said initial filter reject across the upstream side of said intermediate filtrate.

16. The system as recited in claim 1, wherein said first filter is capable of withstanding pressures in the range of about 760 mm Hg vacuum to about 1000 psig.

17. A two-stage fluid treatment system for collecting substances carried by a fluid said system comprising:
- a first filter having a first upstream side, a first down stream side, and a first particle collection size rating, said first upstream side of said first filter being in fluid communication with a source of fluid, wherein upon contact with said first filter, said fluid is divided into a first filter filtrate which passes through said first filter and a first filter reject which does not pass through said first filter, said first filter reject containing particulate and dissolved substances;
- a first stage recycle loop in fluid communication with said first filter and adapted to carry a first stage reject recirculation stream, said first stage reject recirculation stream adapted to receive said first filter reject;
- means for directing and controlling said first stage reject recirculation stream;
- a second filter in fluid communication with said first filter and said first stage recycle loop, said second filter having a second upstream side, a second down stream side, and a second particle collection size rating that is no smaller than said first particle collection size rating, wherein said second filter is adapted to receive said first filter reject from said second upstream side, wherein upon contact with said second filter, said first filter reject is divided into a second filter filtrate and a second filter reject, said first stage recirculation stream adapted to receive said second filter filtrate from said second down stream side;
- a first reject cake connected to said second filter that is formed by the agglomeration of said particulate on said second filter upstream side, wherein said first stage reject recirculation stream directing and controlling means is adapted to direct a portion of said first stage reject recirculation stream through said second filter at a flux low enough to just pass through said second filter so as to form said first filter reject cake;
- a sequential step fluid filtering system in fluid communication with said first filter, said sequential step fluid filtering system comprising:
- an initial filter, said initial filter having an initial filter particle collection size rating;
- an intermediate filter, said intermediate filter having an intermediate filter particle collection size rating that is no smaller than said initial filter particle collection size rating; and
- a final filter, said final filter having a final filter particle collection size rating that is no smaller than said intermediate filter particle collection size rating, wherein said initial filter is adapted to process said first filter filtrate, said first filter filtrate being divided into an initial filter filtrate and an initial filter reject upon contact with said initial filter, wherein said intermediate filter is adapted to process said initial filter reject, said initial filter filtrate being divided into an intermediate filter filtrate and an intermediate filter reject upon contact with said intermediate filter, and wherein said final filter is adapted to process said intermediate filter reject, said intermediate filter filtrate being divided into a final filter filtrate and a final filter reject upon contact with said final filter;
- a second stage recycle loop in fluid communication with said intermediate filter and adapted to carry a second stage reject recirculation stream, said second stage reject recirculation stream adapted to receive said intermediate filter reject;
- means for directing and controlling said second stage reject recirculation stream; and
- a second reject cake connected to said final filter that is formed by the agglomeration of said particulate on said final filter upstream side, wherein said second stage reject recirculation stream directing and controlling means is adapted to direct a portion of said second stage reject recirculation stream through said final filter at a flux low enough to just pass through said final filter so as to form said second reject cake.

* * * * *